US009177369B2

(12) United States Patent
Kitagawa

(10) Patent No.: US 9,177,369 B2
(45) Date of Patent: Nov. 3, 2015

(54) IMAGE DEFORMATION APPARATUS AND METHOD OF CONTROLLING OPERATION OF SAME

(71) Applicant: FUJIFILM CORPORATION, Tokyo (JP)

(72) Inventor: Junya Kitagawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 81 days.

(21) Appl. No.: 14/594,800

(22) Filed: Jan. 12, 2015

(65) Prior Publication Data
US 2015/0125078 A1  May 7, 2015

Related U.S. Application Data

(63) Continuation of application No. PCT/JP2013/065033, filed on May 30, 2013.

(30) Foreign Application Priority Data

Jul. 13, 2012 (JP) .................................. 2012-157126

(51) Int. Cl.
*G06K 9/34* (2006.01)
*G06T 5/50* (2006.01)
*G06T 7/00* (2006.01)
(Continued)

(52) U.S. Cl.
CPC ................. *G06T 5/50* (2013.01); *G06T 3/0093* (2013.01); *G06T 5/003* (2013.01); *G06T 7/003* (2013.01); *G06T 7/0081* (2013.01); *G06T 7/0097* (2013.01); *G06T 2207/10016* (2013.01);
(Continued)

(58) Field of Classification Search
None
See application file for complete search history.

(56) References Cited

U.S. PATENT DOCUMENTS 5,986,668 A * 11/1999 Szeliski et al. ................ 345/634
6,173,087 B1 * 1/2001 Kumar et al. ................. 382/284
(Continued)

FOREIGN PATENT DOCUMENTS

JP       10-304246 A       11/1998
JP     2002-515150 A        5/2002
(Continued)

OTHER PUBLICATIONS

International Search Report, issued in PCT/JP2013/065033, dated Aug. 13, 2013.
(Continued)

*Primary Examiner* — Amir Alavi
*Assistant Examiner* — Alexander J Lesnick
(74) *Attorney, Agent, or Firm* — Birch, Stewart, Kolasch & Birch, LLP

(57) ABSTRACT

A target image is deformed in such a manner that a subject in a reference image and a subject in the target image will coincide. A reference image and a target image are each divided into regions that conform to amounts of optical distortion. A region which is in the target image and which is common to the reference image and to the target image is subdivided into regions S35 to S37, S38 to S40, S42 to S44 in each of which amounts of optical distortion of both the reference image and target image are obtained. By using the amounts of optical distortion of the reference image and amounts of optical distortion of the target image 11 obtained from the subdivided regions S35 to S37, S38 to S40, S42 to S44, the target image is deformed in such a manner that a subject in the common region will coincide with the reference image.

7 Claims, 24 Drawing Sheets

(51) Int. Cl.
 *G06T 5/00* (2006.01)
 *G06T 3/00* (2006.01)

(52) U.S. Cl.
 CPC ............. *G06T2207/20141* (2013.01); *G06T 2207/20221* (2013.01)

(56) References Cited

U.S. PATENT DOCUMENTS

| | | | |
|---|---|---|---|
| 6,292,593 B1* | 9/2001 | Nako et al. | 382/284 |
| 7,277,118 B2* | 10/2007 | Foote | 348/36 |
| 8,818,101 B1* | 8/2014 | Lim | 382/190 |
| 2005/0063608 A1* | 3/2005 | Clarke et al. | 382/284 |
| 2007/0002145 A1 | 1/2007 | Furukawa | |
| 2008/0143745 A1* | 6/2008 | Jin et al. | 345/629 |
| 2010/0034483 A1* | 2/2010 | Giuffrida et al. | 382/284 |
| 2010/0171810 A1* | 7/2010 | Ohki | 348/36 |
| 2011/0157386 A1 | 6/2011 | Ishii | |

FOREIGN PATENT DOCUMENTS

| | | |
|---|---|---|
| JP | 2007-13430 A | 1/2007 |
| JP | 2010-161520 A | 7/2010 |
| JP | 2011-49733 A | 3/2011 |
| JP | 2011-139368 A | 7/2011 |
| JP | 2011-147985 A | 8/2011 |

OTHER PUBLICATIONS

Written Opinion of the International Searching Authority, issued in PCT/JP2013/065033, dated Aug. 13, 2013.

* cited by examiner

US 9,177,369 B2

IMAGE DEFORMATION APPARATUS AND METHOD OF CONTROLLING OPERATION OF SAME

CROSS-REFERENCE TO RELATES APPLICATIONS

This application is a Continuation of PCT International Application No. PCT JP2013/065033 filed on May 30, 2013, which claims priority under 35 U.S.C. §119(a) to Japanese Patent Application No. 2012-157126 filed Jul. 13, 2012. Each of the above application is hereby expressly incorporated by reference, in its entirety, into the present application.

BACKGROUND OF THE INVENTION

1. Field of the Invention

This invention relates to an image deformation apparatus and to a method of controlling the operation of this apparatus.

2. Description of the Related Art

In cases where a target image is combined with (superimposed upon) a reference image, there is a possibility that multiplexing or a decline in resolution will be brought about after combining the images if the alignment accuracy of the reference image and target image is low. In order to improve alignment accuracy, it is necessary to deal not only with a positional shift of the entire image but also with a positional shift of each individual subject that does not correspond to the shift of the entire image. Lens distortion is known as a cause of such shifting of individual images. Since lens distortion tends to become more pronounced the greater the distance from the optical center of the lens, the amount of distortion differs, even within the same image, depending upon position in the image. Further, if the angle of view changes, the position of a subject in the image changes as well and, hence, the amount of distortion of a subject shared by both the reference image and the target image will also differ.

FIG. 1 is an example of a reference image 1. The reference image 1 includes the sun 2 as a subject at the upper left and a house 3 as a subject at the center. Since the house 3 is at the center, there is little distortion ascribable to lens distortion. However, since the sun 2 is at the upper left, there is a great amount of distortion caused by lens distortion.

FIG. 3 is an example of a target image 11. The target image 11 includes the sun 12 as a subject that is slightly off-center and a house 13 as a subject at the lower right. Since the sun 12 is slightly off-center, there is little distortion ascribable to lens distortion. However, since the house 13 is at the lower right, there is a great amount of distortion caused by lens distortion.

There is a technique for suppressing a decline in resolution due to lens distortion or a difference in lens fuselage at the time of image compositing, thereby producing a panorama image that is free of a sense of incongruity (Patent Document 1), a technique for detecting video distortion, subjecting the distortion to a function approximation region by region and compensating for distortion in each region using a calculated function (Patent Document 2), and a technique for generating a blended motion-compensated image from a global motion-compensated image and a local motion-compensated image and combining a reference image with the blended motion-compensated image to thereby obtain a high noise-reduction effect (Patent Document 3).

Furthermore, there is a technique for reducing amount of calculation while taking into consideration the distortion aberration of an optical system (Patent Document 4) and a technique which, when an imaging device performs split photography of a subject, sets the shooting direction appropriately in such a manner that the size of a superimposed region will be satisfactory at the time the individual captured images are joined (Patent Document 5).

Patent Document 1: Japanese Patent Application Laid-Open No. 2010-161520
Patent Document 2: Japanese Patent Application Laid-Open No. 2011-49733
Patent Document 3: Japanese Patent Application Laid-Open No. 2011-147985
Patent Document 4: Japanese Patent Application Laid-Open No. 2007-13430
Patent Document 5: Japanese Patent Application Laid-Open No. 2011-139368

FIG. 33 is an example of an image obtained by combining the reference image 1 and the target image 11 in such a manner that the sun 2 and house 3 in the reference image 1 will coincide with the sun 12 and house 13, respectively, of the target image 11. Since the amount of distortion of the sun 2 and the amount of distortion of the sun 12 differ as do the amount of distortion of the house 3 and the amount of distortion of the house 13, the sun images are misaligned and so are the house images. Thus, a composite image in which the subjects are not misaligned cannot be obtained merely by combining the reference image 1 and the target image 11 in such a manner that identical subjects simply overlap each other.

Patent Document 1 does not describe a concrete method for dealing with locations where alignment is difficult owing to distortion caused by lens distortion. A composite image in which subjects are not misaligned cannot be obtained. Further, distortion is merely corrected for in Patent Document 2, and Patent Document 3 does not describe a region dividing method for dealing with such causes of distortion as lens distortion. A composite image in which the subjects are not misaligned cannot be obtained with the techniques taught in Patent Documents 4 or 5.

SUMMARY OF THE INVENTION

An object of the present invention is to deform a target image so as to produce a composite image in which subjects are not misaligned.

An image deformation apparatus according to the present invention comprises: an image input device (image input means) for inputting multiple frames of an image obtained by imaging the same subject multiple times (there are not only cases where the entire subject is the same each time but also cases where a subject that is a portion of the entire subject is the same each time); a reference image decision device (reference image decision means) for deciding a reference image from among the multiple frames of the image that have been input from the image input device; a target image decision device (target image decision means) for deciding a target image from among the multiple frames of the image other than the reference image that have been input from the image input device; a region dividing device (region dividing means) for dividing the reference image decided by the reference image decision device and the target image decided by the target image decision device into regions that conform to amounts of optical distortion; a region subdividing device (region subdividing means) for subdividing a common region, which is in the target image and is a region common to the reference image and to the target image, into regions in each of which both amount of optical distortion of the reference image and amount of optical distortion of the target image can be partitioned, in accordance with the amounts of optical distortion in respective ones of the regions of the reference image and regions of the target image divided by the region dividing device; and a deformation device (deformation means) for deforming the target image using the amounts of optical distortion of the reference image and amounts of optical distortion of the target image obtained from the regions subdivided by the region subdividing device, and making a subject in the common region coincide with the reference image. (The target image is deformed in such a manner that the target image will coincide with the reference image, but the target image need not necessarily coincide perfectly.)

The present invention also provides an operation control method suited to the above-described image deformation apparatus. Specifically, the present invention provides a method of controlling operation of an image deformation apparatus, the method comprising steps of: an image input device inputting multiple frames of an image obtained by imaging the same subject multiple times; a reference image decision device deciding a reference image from among the multiple frames of the image that have been input from the image input device; a target image decision device deciding a target image from among the multiple frames of the image other than the reference image that have been input from the image input device; a region dividing device dividing the reference image decided by the reference image decision device and the target image decided by the target image decision device into regions that conform to amounts of optical distortion; a region subdividing device subdividing a common region, which is in the target image and is a region common to the reference image and to the target image, into regions in each of which both amount of optical distortion of the reference image and amount of optical distortion of the target image can be partitioned, in accordance with the amounts of optical distortion in respective ones of the regions of the reference image and of the regions of the target image divided by the region dividing device; and a deformation device deforming the target image using the amounts of optical distortion of the reference image and amounts of optical distortion of the target image obtained from the regions subdivided by the region subdividing device, and making a subject in the common region coincide with the reference image.

In accordance with the present invention, a region in the reference image and common to the reference image and to a target image is subdivided into regions in each of which both the amount of distortion of the reference image and the amount of distortion of the target image are obtained. The target image is deformed so as to make a subject in the common region coincide with the reference image by using the amounts of optical distortion of the reference image and of the target image obtained from the regions subdivided. The image within the common region in the deformed target image is deformed taking into consideration both the optical distortion of the target image and the optical distortion of the reference image. As a result, when the target image is combined with the reference image, the two images will coincide without misalignment between a subject in the target image and a subject in the reference image.

The apparatus may further comprise a correction device (correction means) for performing an optical-distortion correction in a case where the optical axis of an imaging optical system utilized in capturing the reference image and the target image is offset from centers of the reference image and target image, the optical-distortion correction being performed centered on offset position of the optical axis. In this case, by way of example, the region dividing device divides the reference image and the target image, the amounts of optical distortion of which have been corrected by the correction device, into regions in accordance with the corrected amounts of optical distortion.

The apparatus may further comprise an aligning device (aligning means) for aligning the reference image and the target image based upon a motion vector of the target image with respect to the reference image. In this case, by way of example, if the reference image and target image have been aligned by the aligning device, the region dividing device would, with regard to non-coincident portions of the images, divide the reference image and the target image into regions in accordance with the corrected amounts of optical distortion.

The apparatus may further comprise an aligning device (aligning means) for aligning the reference image and the target image based upon a motion vector of the target image with respect to the reference image; and a determination device (determination means) for determining that the reference image or the target image contains a moving body if degree of non-coincidence is equal to or greater than a predetermined value.

By way of example, the region dividing device divides the reference image and the target image into rectangular regions or concentric circular regions that conform to amounts of optical distortion.

The apparatus may further comprise a compositing device (compositing means) for combining the reference image and the target image that have been deformed by the deformation device.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

According to this embodiment, a reference image and a target image are decided from among subject images obtained by imaging performed multiple times, and the target image is combined with (superimposed upon) the reference image. The reference image and target image are combined in such a manner that subjects that are common to both the reference image and the target image will coincide. In a case where the optical axis of the imaging lens and the center of the image of a subject obtained by imaging coincide, the amount of distortion increases from the center of the subject image toward the outer side thereof owing to optical distortion such as distortion ascribable to the imaging lens. In such case, even if the reference image and target image are combined, subjects included in common in both the reference image and the target image will not coincide owing to a difference between the amounts of distortion. In this embodiment, when a reference image and a target image are combined, subjects common to both the reference image and the target image are made to coincide.

Figure 1:
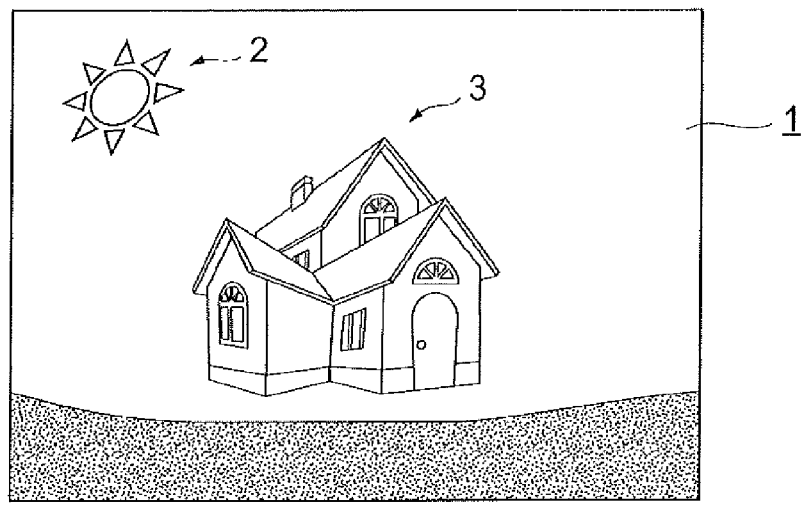
FIG. 1 is an example of a reference image.

FIG. 1 is an example of a reference image 1. The reference image 1 includes the sun 2 as a subject at the upper left and a house 3 as a subject substantially at the center.

Figure 2:
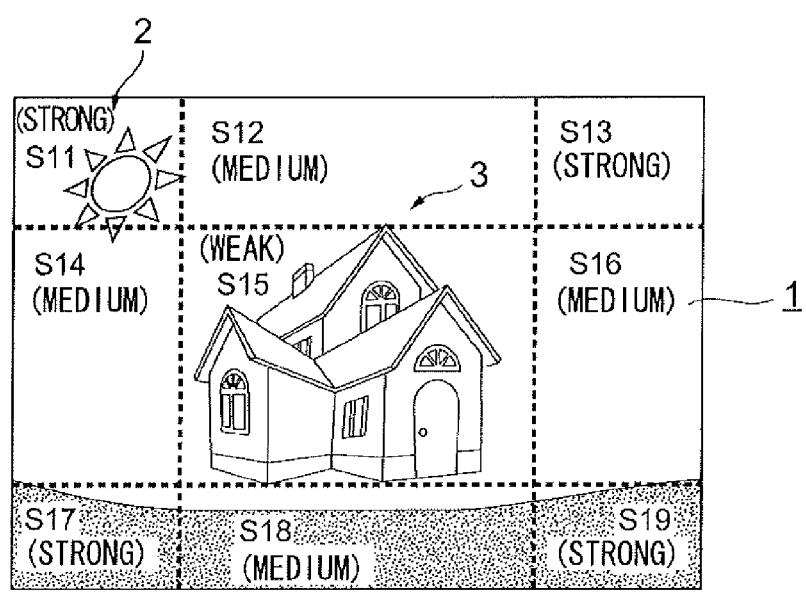
FIG. 2 is an example of the reference image divided into regions.

FIG. 2 illustrates the manner in which the reference image 1 is divided into regions.

As mentioned above, amount of distortion differs depending upon the region of the reference image 1 owing to the distortion of the imaging lens. Generally, as set forth above, the closer to the center of the image of the subject, the smaller the amount of optical distortion, with the amount of optical distortion increasing as distance from the center increases.

The reference image 1 has been divided into nine regions (rather than nine regions, however, the number of regions may be smaller or larger than nine) S11 to S19.

Regions S11, S13, S17 and S19 at the corners of the reference image 1 are spaced away from the center and therefore exhibit a strong (large) amount of optical distortion, whereas the region S15 at the center of the reference image 1 exhibits a weak (small) amount of optical distortion. Regions S12, S14, S16 and S18 above, below and to the left and right of the central region S15 exhibit a medium amount of optical distortion (an amount intermediate the amount of optical distortion of the central region S15 and amount of optical distortion of the four corner regions S11, S13, S17 and S19). These amounts of optical distortion are written within the parentheses near the region numbers. For example, the sun 2 exhibits a strong amount of optical distortion since it is located in region S11 at the upper-left corner, and the house 3 exhibits a weak amount of optical distortion since it is located in the central region S15.

Figure 3:
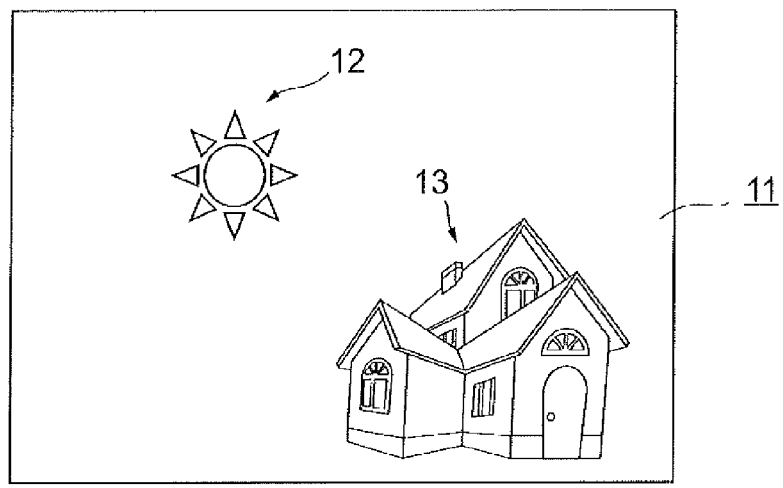
FIG. 3 is an example of a target image.

FIG. 3 is an example of the target image 11.

The target image 11 contains the sun 12 and house 13 as subjects. There are instances where the reference image 1 and target image 11 have different angles of view owing to camera shake and the like. As a consequence, even though the subjects in the reference image 1 are the same as those in the target image 11, there are instances where the relative positions of the subjects in the subject images differ. For example, whereas the sun 2 is at the upper left in the reference image 1, the sun 12 is somewhat closer to the center in the target image 11. Further, while the house 3 is substantially at the center in the reference image 1, the house 13 is at the lower right in the target image 11.

Figure 4:
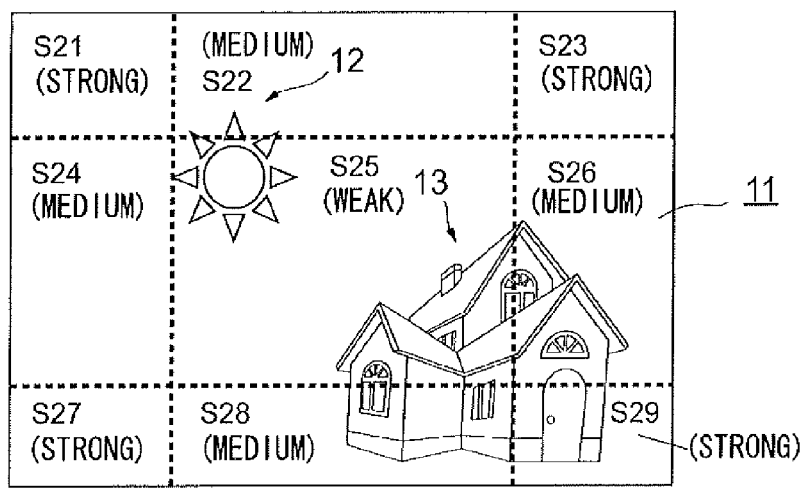
FIG. 4 is an example of the target image divided into regions.

FIG. 4 illustrates the manner in which the target image 11 is divided into regions.

In a manner similar to the reference image 1, the target image 11 has been divided into nine regions S21 to S29. Naturally, the number of regions of target image 11 may be smaller or larger than nine and the target image 11 may be divided into regions in a manner different from the reference image 1.

Regions S21, S23, S27 and S29 at the corners of the target image 11 are spaced away from the center and therefore exhibit a strong (large) amount of optical distortion, whereas the region S25 at the center of the target image 11 exhibits a weak (small) amount of optical distortion. Regions S22, S24, S26 and S28 above, below and to the left and right of the central region S25 exhibit a medium amount of optical distortion (an amount intermediate the amount of optical distortion of the central region S25 and amount of optical distortion of the four corner regions S21, S23, S27 and S29). These amounts of optical distortion are written within the parentheses near the region numbers. For example, the sun 12 exhibits a weak amount of optical distortion since it is located in central region S25. Since the house 13 is located in the regions S25, S26, S28 and S29, the amount of optical distortion differs depending upon the particular portion of the house 13.

Thus, even though the same subjects appear in both images, as in the manner of the sun 2 in the reference image 1 and the sun 12 in the target image 11 as well as the house 3 in the reference image 1 and the house 13 in the target image 11, the fact that the amounts of distortion differ means that even if the reference image 1 and the target image 11 are combined so as to make identical images coincide, an offset will be produced. That is, even if the sun 2 and the sun 12 are combined as well as the house 3 and the house 13, they will not match and an offset will arise between them. In this embodiment, divided regions of the target image 11 are each subdivided in accordance with both the amount of distortion of the reference image 1 and amount of distortion of the target image 11. Since both the amount of distortion of the reference image 1 and amount of distortion of the target image 11 can be ascertained in each of the subdivided regions, the target image 11, in a case where it is combined with the reference image 1, can be deformed so as to match the reference image 1 by using both the amount of distortion of the reference image 1 and amount of distortion of the target image 11.

Figures 5, 6:
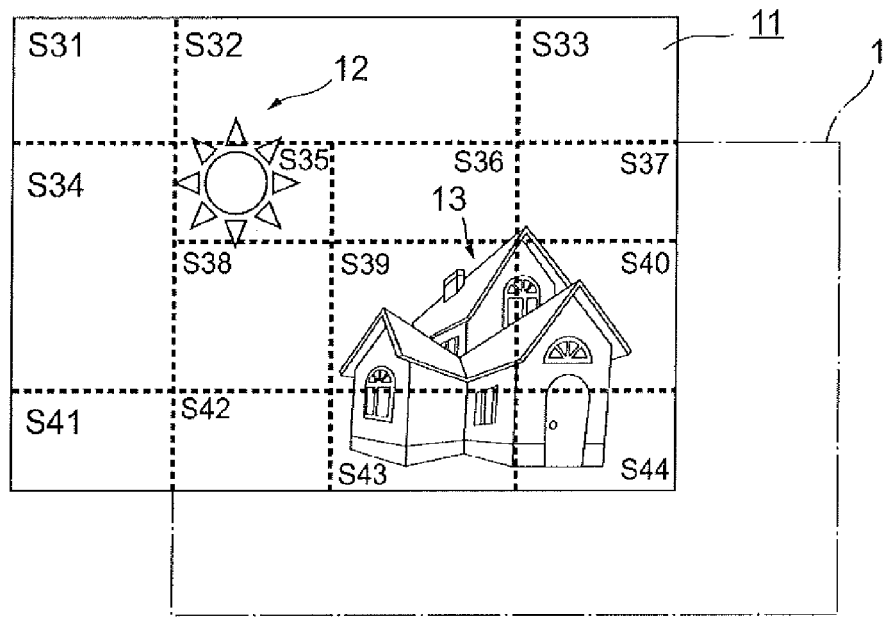
FIG. 5 is an example of the target image subdivided into regions.
FIG. 6 illustrates the relationship between regions, which are obtained by subdivision, and optical distortion.

FIG. 5 is an example of the target image 11 after regions have been subdivided.

When the reference image 1 divided into regions shown in FIG. 2 is combined with the target image 11 divided into regions shown in FIG. 4 in such a manner that identical subjects (the sun 2 and the sun 12, and the house 3 and the house 13) are superimposed, the target image is further divided into finer regions (subdivided into these regions), as shown in FIG. 5, in each of which both amount of optical distortion of the reference image 1 and amount of optical distortion of the target image 11 can be classified, based upon the divided regions in reference image 1 shown in FIG. 2 and divided regions in target image 11 shown in FIG. 4.

By thus performing region subdivision in the target image 11, regions S31 to S44 are produced in the target image 11.

FIG. 6 illustrates amounts of optical distortion in each region obtained by region subdivision in the target image 11.

Although regions S31 to S44 are obtained by region subdivision as described above, the amounts of distortion of the reference image 1 and the amounts of distortion of the target image 11 are obtained only in a common region 10, which is a region common to the reference image 1 and to the target image 11 representing the common portions of the images of the subjects. Only the common region 10 may be adopted as the target of region subdivision. In FIG. 6, therefore, amounts of distortion are written within the parentheses in each of the regions S35 to S37, S38 to S40 and S42 to S44 within the common region 10. The amounts of distortion are represented by the characters reading strong, medium and weak. STRONG indicates that the amount of distortion is strong, MEDIUM that the amount of distortion is medium, and WEAK that the amount of distortion is weak. The first set of characters within the parentheses indicates the amount of distortion of the reference image 1 in that region, and the second set of characters within the parentheses indicates the amount of distortion of the target image 11 in that region. For example, since the amounts of distortion are written as being (STRONG, WEAK) in region S35, this indicates that the amount of distortion of reference image 1 and amount of distortion of target image 11 corresponding to region S35 are strong and weak, respectively. Similarly, since the amounts of distortion are written as being (MEDIUM, WEAK) in region S36, this indicates that the amount of distortion of reference image 1 and amount of distortion of target image 11 corresponding to region S36 are medium and weak, respectively. Amounts of distortion are indicated similarly in the other regions.

Figure 7:
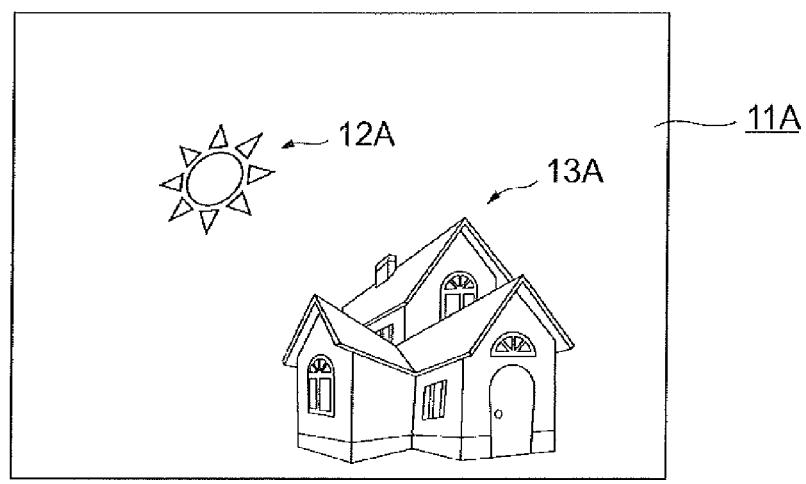
FIG. 7 is an example of a deformed target image.

FIG. 7 is an example of target image 11A after deformation thereof.

With regard to the regions within the common region 10, as shown in FIG. 6, it is possible to ascertain not only the amounts of optical distortion of the target image 11 but also the amounts of optical distortion of the corresponding regions in the reference image 1. Therefore, by using both amounts of optical distortion, namely the amounts of optical distortion of both the target image 11 and the reference image 1, the target image 11A is deformed in such a manner that the subjects (the sun 12 and the house 13) contained in the target image 11 will coincide with the subjects (the sun 2 and the house 3), which are contained in the reference image 1, in a case where the target image 11 has been combined with the reference image 1. The target image 11 thus deformed is the deformed target image 11A illustrated in FIG. 7.

The target image 11A thus deformed contains the sun 12A and the house 13A that coincide with the sun 2 and the house 3, which are distorted owing to lens distortion, contained in the reference image 1. By combining the deformed target image 11A and the reference image 1, a composite image that is free of misalignment is obtained.

Figure 8:
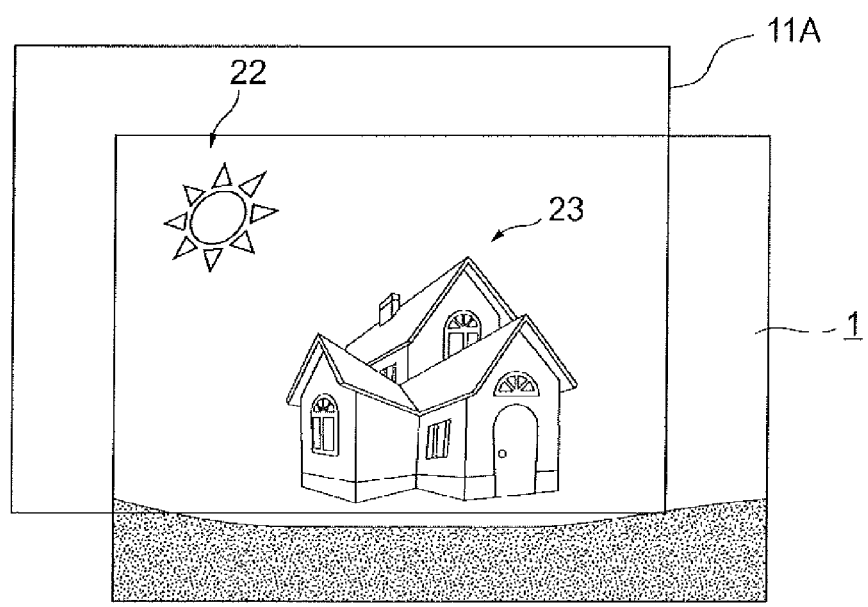
FIG. 8 illustrates the manner in which the reference image and the target image have been aligned.

FIG. 8 illustrates the manner in which the deformed target image 11A and the reference image 1 are combined.

Since the target image 11A has been deformed as described above, a composite image that includes an offset-free sun 22 and an offset-free house 23 is obtained when the target image 11A is combined with the reference image 1.

Thus, even though optical distortion differs between the reference image 1 and target image 11 from portion to portion, a composite image (image resulting from superimposing images) containing offset-free subjects is obtained.

Figure 9:
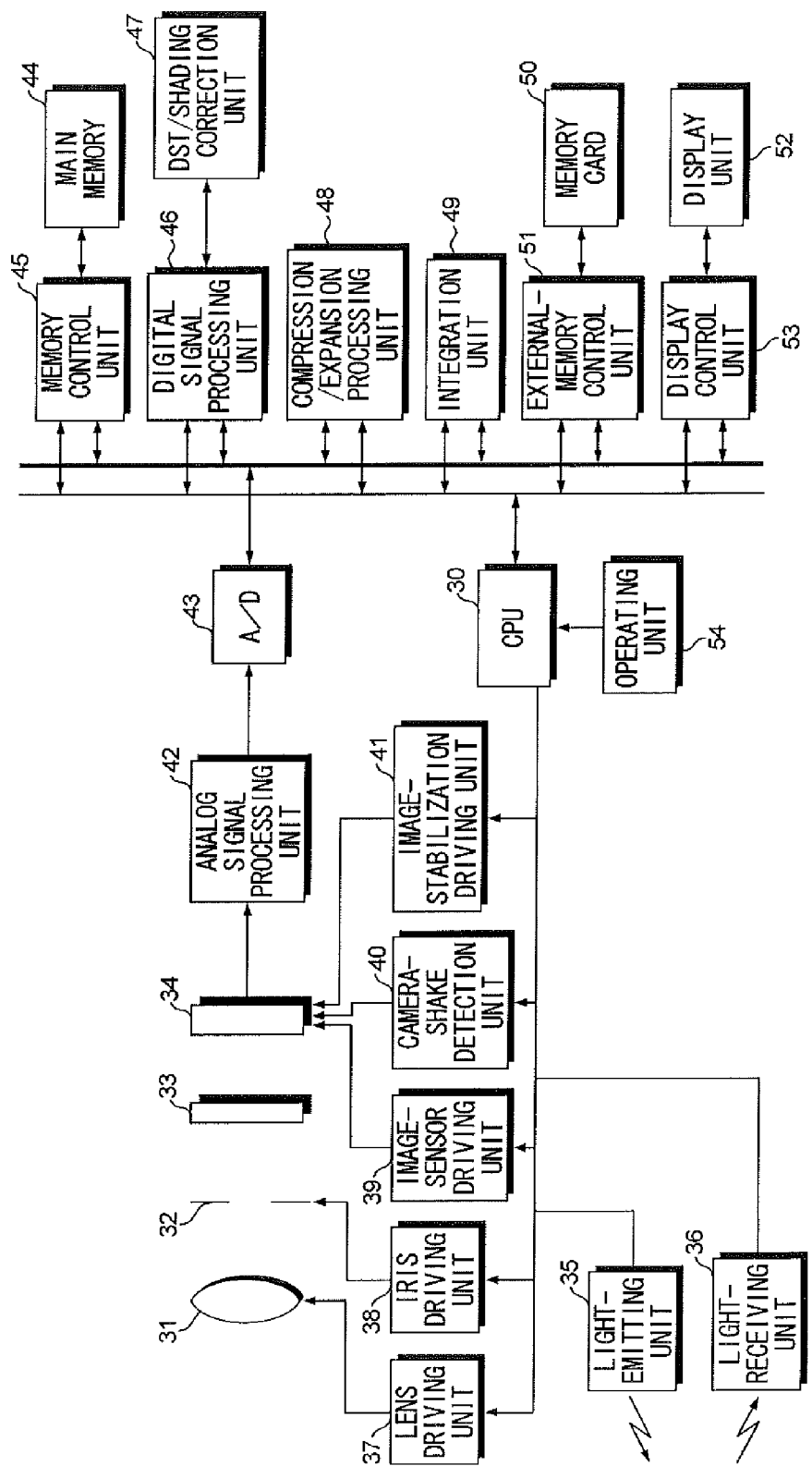
FIG. 9 is a block diagram illustrating the electrical configuration of an image sensing apparatus.

FIG. 9 is a block diagram illustrating the electrical configuration of an image sensing apparatus.

The overall operation of the image sensing apparatus is controlled by a CPU 30.

The image sensing apparatus includes an operating unit 54 having switches, buttons and the like for inputting commands such as a shooting command and continuous shooting command. An operating signal that is output from the operating unit 54 is input to the CPU 30. The image sensing apparatus further includes a light-emitting unit 35 for illuminating a subject and a light-receiving unit 36 for receiving light reflected from the subject.

An imaging lens 31 is positioned in front of an image sensor 34. (There is a mechanical shutter in front of the imaging lens 31 but this is not illustrated.) An iris 32 and an optical low-pass filter 33 are disposed between the photoreceptor surface of the image sensor 34 and the imaging lens 31. The imaging lens 31 is positioned along the direction of the optical axis by a lens driving unit 37, and the amount by which the iris 32 is opened is controlled by an iris driving unit 38. A video signal output, etc., of the image sensor 34 is controlled by an image-sensor driving unit 39. The image sensing apparatus further includes a camera-shake detection unit 40 for detecting camera shake sustained by the image sensor 34 and an image-stabilization driving unit 41 for shifting the image sensor 34.

The video signal that has been output from the image sensor 34 is subjected to predetermined analog signal processing such as white balance in an analog signal processing unit 42, which outputs the processed signal. The video signal that is output from the analog signal processing unit 42 is converted to digital image data by an analog/digital conversion circuit 43.

The digital image data is recorded temporarily in a main memory 44 by a memory control unit 45. The digital image data is read out of the main memory 44 and is subjected to predetermined digital signal processing such as a gamma correction in a digital signal processing unit 46. The digital image data is input to a distortion/shading correction unit 47, subjected to a distortion correction and to a shading correction with a reference position serving as the reference. The image data that has been subjected to correction such as the distortion correction is applied to a display unit 52 under the control of a display control unit 53, whereby the image of the subject, which has been subjected to correction such as an optical distortion correction, is displayed on the display screen of the display unit 52.

The digital image data read out of the main memory 44 is input to an integration unit 49 as well. The integration unit 49 integrates the luminance component and adjusts the aperture value of the iris 32 based upon the integrated value obtained.

When a record command is applied from the operating unit 54, the image data that has been corrected for optical distortion and the like as described above is applied to and recorded on a memory card 50 under the control of an external-memory control unit 51.

The deformation of the target image 11 and the combining of the deformed target image 11A and reference image 1 in the manner described above are carried out in a case where continuous shooting has been performed. It goes without saying that these operations are not limited to instances where continuous shooting has been performed and may be carried out in other cases as well.

Figure 10:
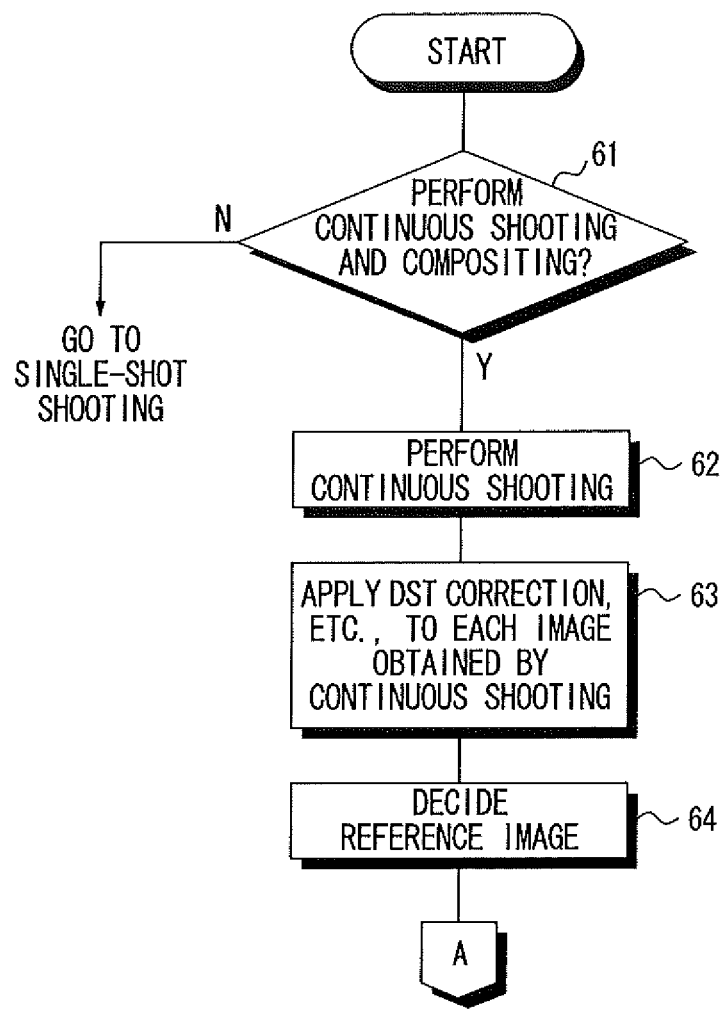
FIGS. 10 and 11 are flowcharts illustrating a portion of processing executed by the image sensing apparatus.
Figure 11:
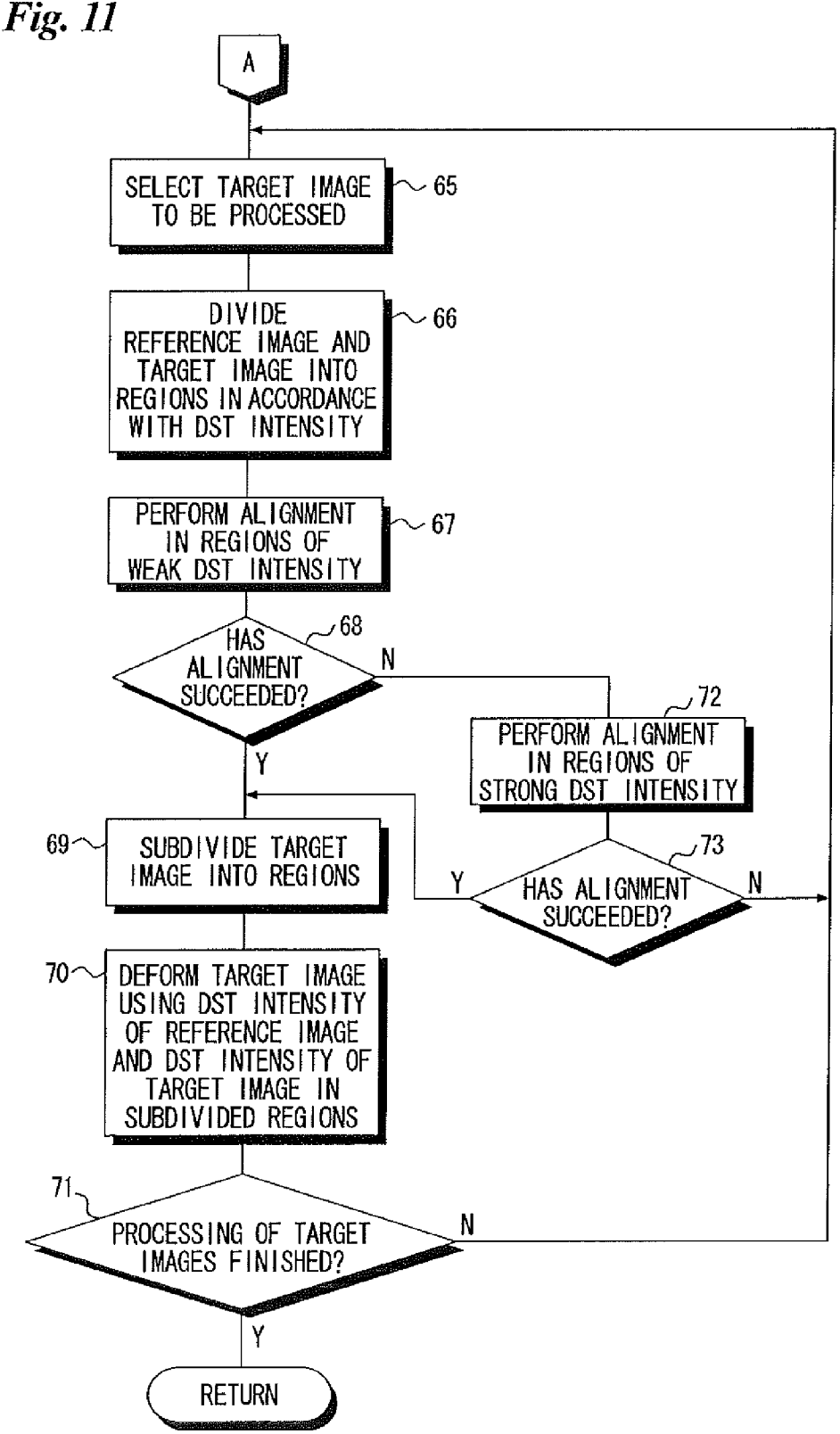

FIGS. 10 and 11 are flowcharts illustrating processing executed by the image sensing apparatus.

If processing for continuous-shooting compositing has not been set by the operating unit 54 ("NO" at step 61), then single-shot shooting is performed and the above-described compositing processing is not executed. If processing for continuous-shooting compositing has been set ("YES" at step 61), continuous shooting is carried out (step 62) and image data representing multiple image frames is recorded temporarily in the main memory 44. The image data representing multiple image frames obtained by continuous shooting is read out of the main memory 44 and input to the distortion/shading correction unit 47, where the data is subjected to a distortion (optical distortion) correction and the like (step 63). The image data representing the multiple image frames that have been subjected to a correction for distortion and the like are applied to the display unit 52, and the multiple image frames represented by this image data are displayed on the display screen of the display unit 52. The operating unit 54 is utilized to decide a reference image from among the multiple image frames displayed (step 64). Further, a target image also is selected from among the multiple image frames displayed (step 65).

As mentioned above, there are instances where even if a distortion correction is performed, distortion cannot be eliminated completely and some will remain. Therefore, as described above (see FIGS. 2 and 4), the decided reference image and the selected target image are each divided into regions in accordance with the intensity of distortion (step 66). Next, the reference image divided into regions and the target image divided into regions are aligned (combined, superimposed) in such a manner that subjects in regions of little distortion will coincide (step 67).

If alignment succeeds in a region of weak distortion ("YES" at step 68), the region of the target image is subdivided based upon the reference image and target image that have been divided into regions in accordance with intensity of distortion (step 69; see FIGS. 5 and 6), as described above. The target image is deformed using the intensity of distortion of the reference image and intensity of distortion of the target image in the subdivided regions of the target image (step 70; FIG. 7).

If alignment does not succeed in a region of weak distortion ("NO" at step 68), alignment is performed in a region of strong distortion (step 72). If alignment succeeds in a region of strong distortion ("YES" at step 73), then the target image is subdivided as described above (step 69) and the target image is deformed (step 70). If alignment does not succeed even in a region of strong distortion ("NO" at step 73), it is construed that the reference image cannot be combined with this target image and, hence, a different target image is selected (step 65).

The processing of steps 65 to 73 is repeated until processing ends with regard to all target images that are to be processed (step 71).

FIGS. 12 to 18 illustrate another embodiment. In this embodiment, a distortion intensity map is generated beforehand from information concerning the imaging lens 31 and the above-described division into regions is performed utilizing the intensity map.

Figure 12:
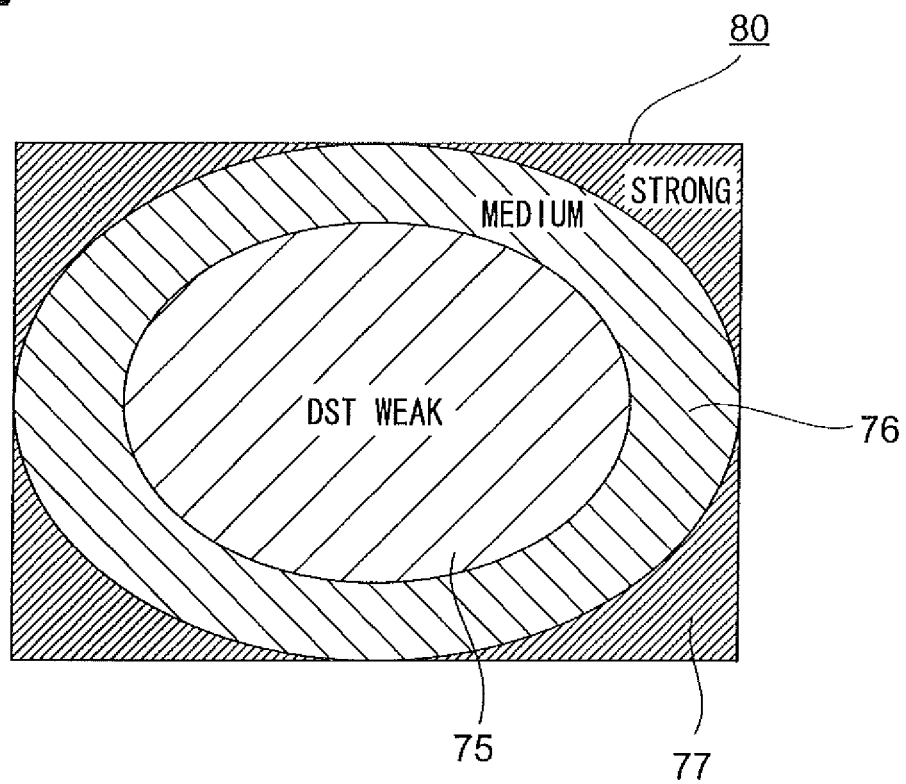
FIG. 12 is an example of a distortion intensity map.

FIG. 12 is an example of a distortion intensity map 80.

The distortion intensity map 80 corresponds to the image of a subject obtained by image capture and indicates the distortion intensities of portions within the image of the subject. The distortion intensity map 80 shown in FIG. 12 has been divided into three regions 75, 76 and 77 in the form of concentric circles. The distortion in elliptical region 75 at the center is weak, the distortion in the region 76 surrounding the region 75 is medium, and the distortion in the outermost region 77 is strong.

Figure 13:
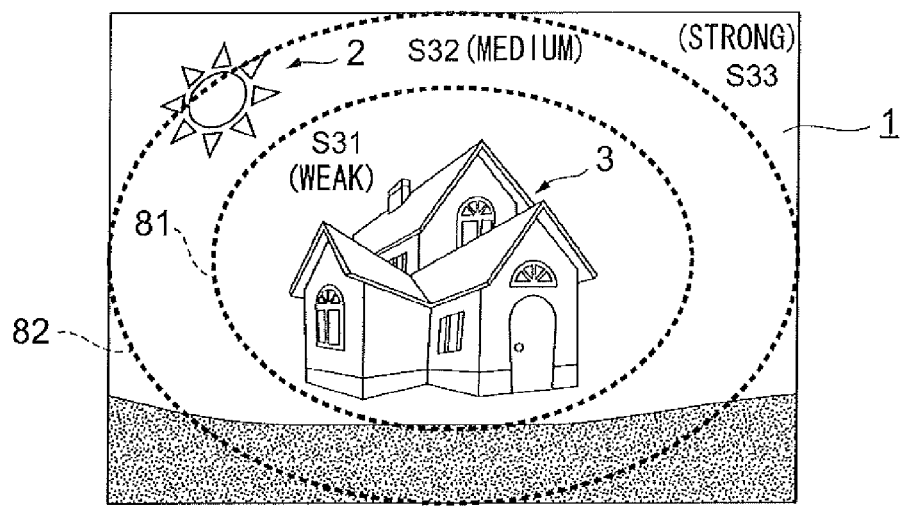
FIGS. 13 and 14 are examples of the reference image and target image, respectively, divided into regions.

FIG. 13 is an example of reference image 1 divided into regions in accordance with the distortion intensity map 80.

Boundaries 81 and 82 have been defined in the reference image 1 in accordance with the distortion intensity map 80. Distortion in region S31 inside boundary 81 is weak, distortion in region S32 located between boundaries 81 and 82 is medium, and distortion in region S33 outside boundary 82 is strong.

Figure 14:
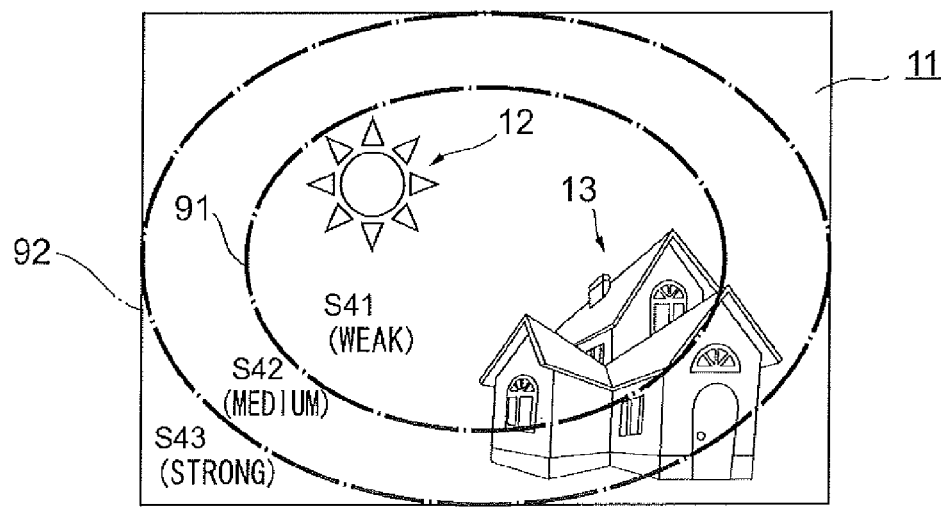

FIG. 14 is an example of target image 11 divided into regions in accordance with the distortion intensity map 80.

Boundaries 91 and 92 have been defined in the target image 11 as well in accordance with the distortion intensity map 80 in a manner similar to the reference image 1. Distortion in region S41 inside boundary 91 is weak, distortion in region S42 located between boundaries 91 and 92 is medium, and distortion in region S43 outside boundary 92 is strong.

Figure 15:
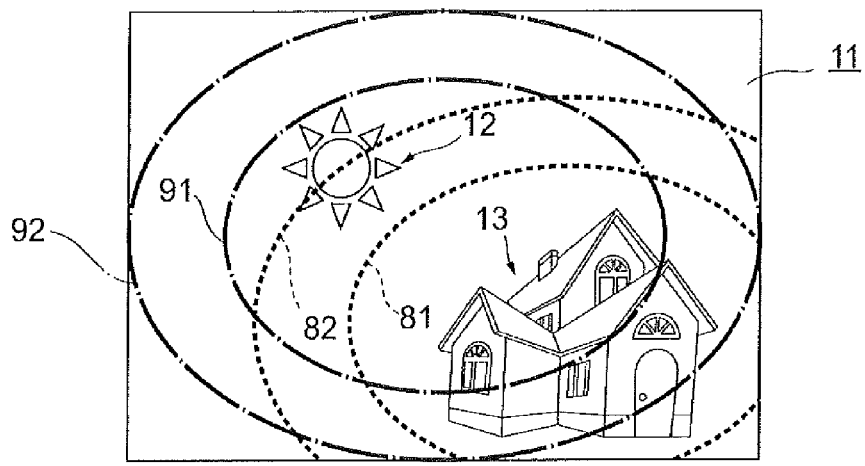
FIG. 15 is an example of the target image subdivided into regions.

FIG. 15 is an example of the target image 11 after regions have been subdivided.

When the reference image 1 divided into regions (see FIG. 13) and the target image 11 divided into regions (see FIG. 14) are obtained, as described above, regions are subdivided based upon the reference image 1 and the target image 11. As a result, in the subdivided regions, it is possible to ascertain both the distortion intensity of every portion of the reference image 1 and distortion intensity of every portion of the target image 11.

Figure 16:
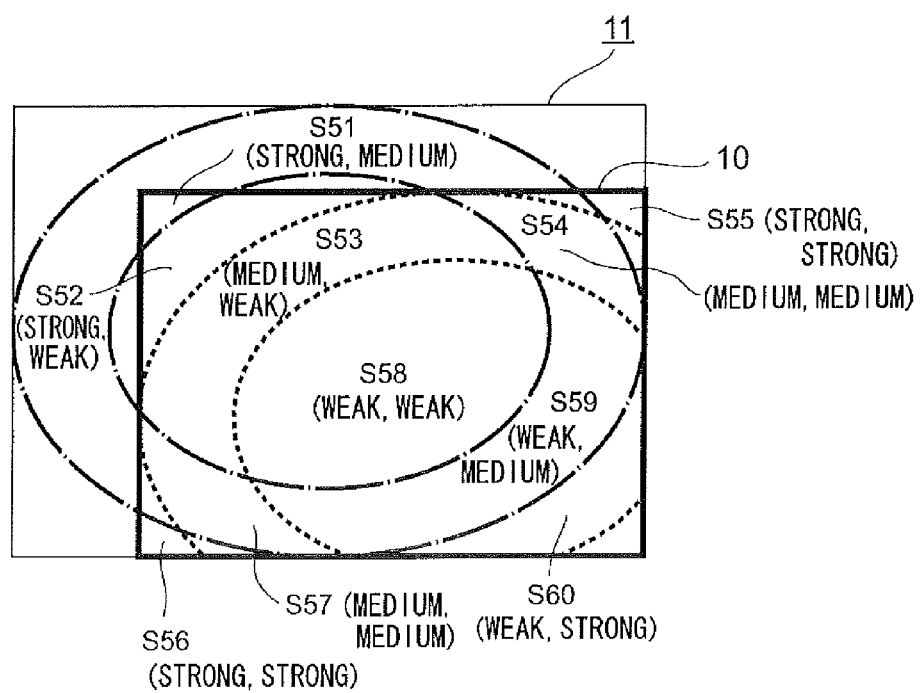
FIG. 16 illustrates the relationship between regions, which are obtained by subdivision, and optical distortion.

FIG. 16 illustrates subdivided regions and distortion intensities in the target image 11.

As described above, regions S51 to S60 are defined in common region 10 by subdividing the target image 11. In a manner similar to that shown in FIG. 6, distortion intensities are written within the parentheses in each of the regions S51 to S60. The distortion intensities are represented by STRONG, MEDIUM and WEAK within the parentheses. The distortion intensity represented by the first set of characters within the parentheses indicates the distortion intensity in the region of the reference image 1 that corresponds to this region. The distortion intensity represented by the second set of characters within the parentheses indicates the distortion intensity of the target image.

Figure 17:
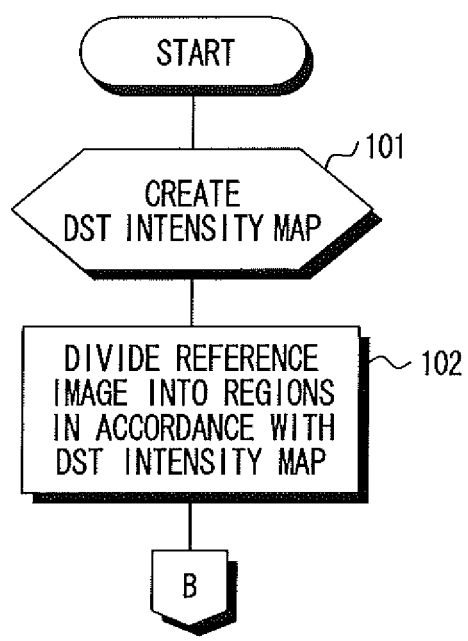
FIGS. 17 and 18 are flowcharts illustrating processing executed by the image sensing apparatus.
Figure 18:
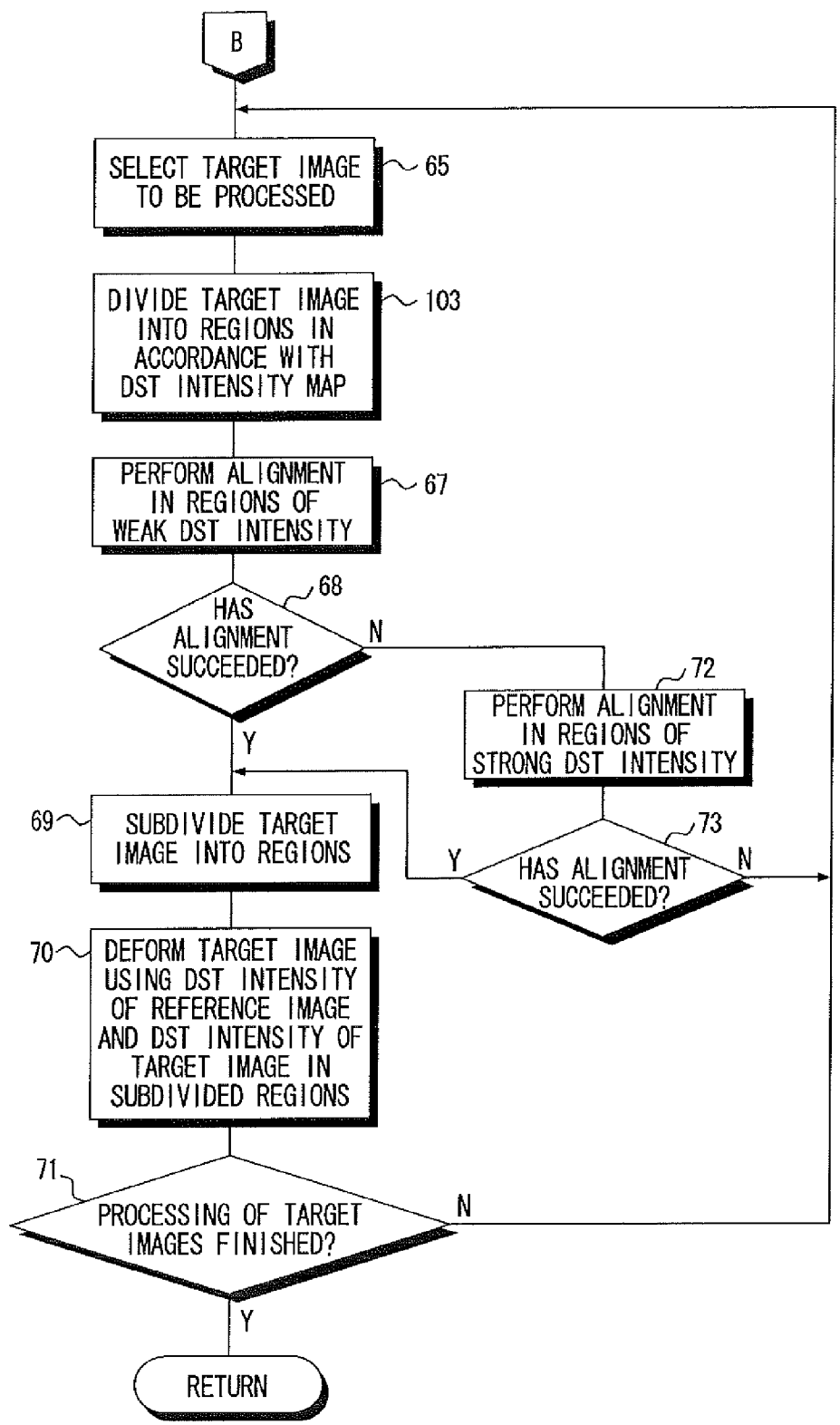

FIGS. 17 and 18 are flowcharts illustrating processing executed by the image sensing apparatus. Processing steps shown in FIGS. 17 and 18 identical with those shown in FIG. 10 or 13 are designated by like stop numbers and need not be described again.

As mentioned above, first a distortion intensity map (see FIG. 12) is created (step 101). A reference image is divided into regions in accordance with the distortion intensity map created (step 102; see FIG. 13). When a target image is selected (step 65), the selected target image is also divided into regions in accordance with the distortion intensity map (step 103). Processing following step 103 is similar to that shown in FIG. 11.

Figure 19:
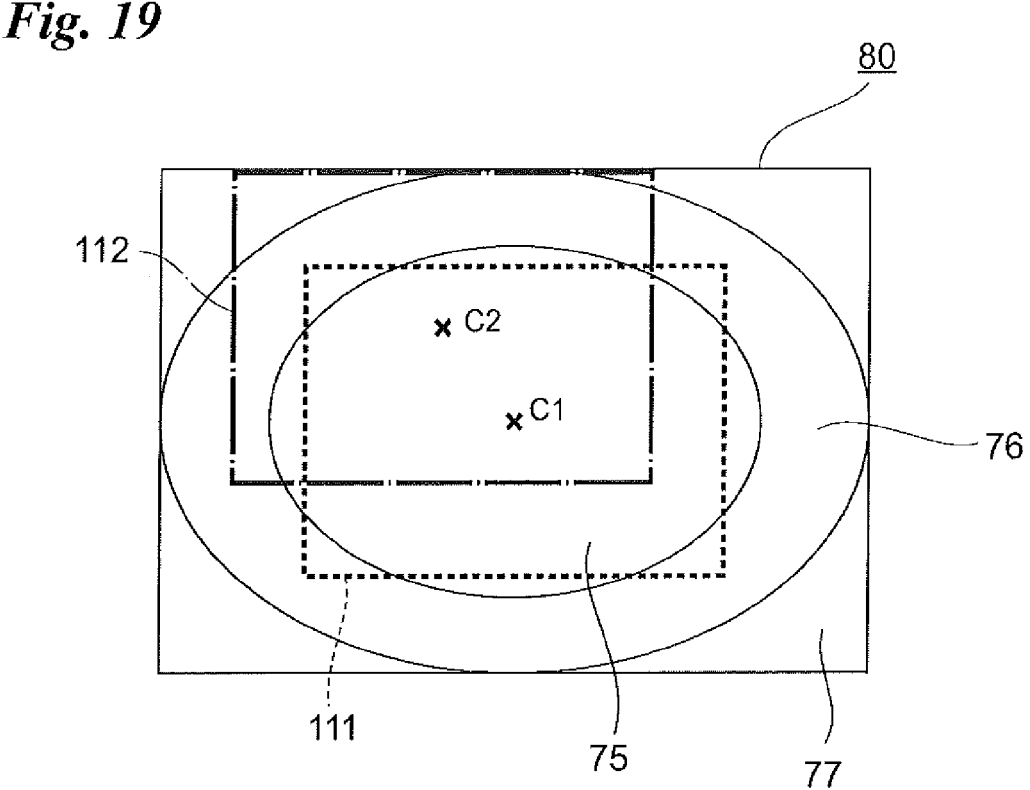
FIG. 19 is an example of a distortion intensity map.
Figure 20:
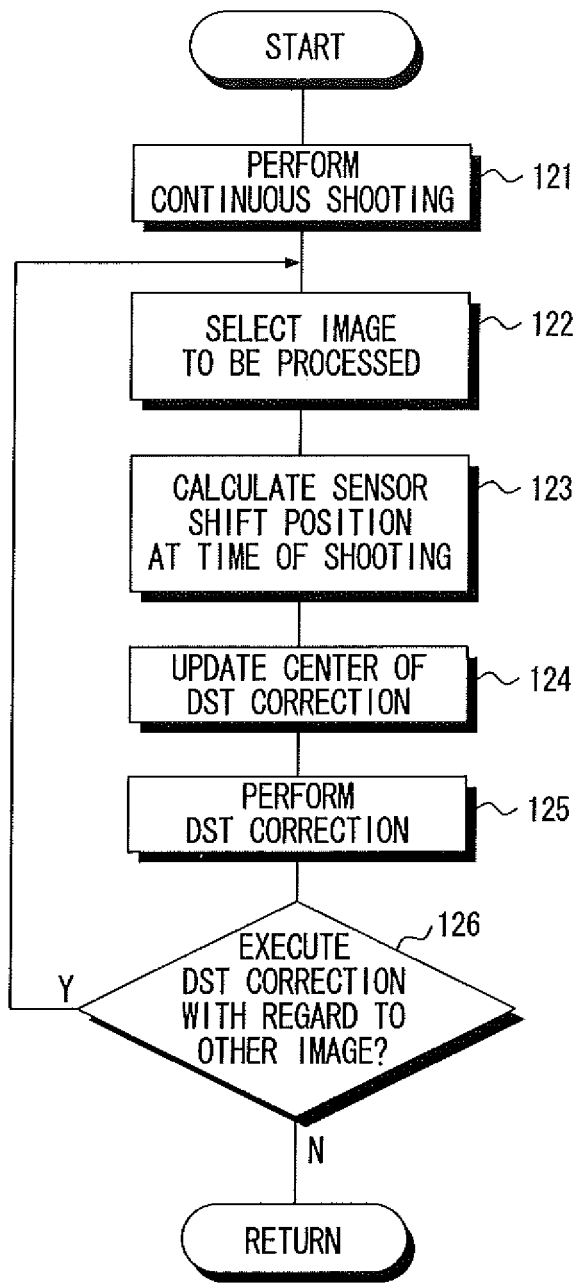
FIGS. 20 and 21 are flowcharts illustrating processing executed by the image sensing apparatus.

FIGS. 19 and 20 illustrate another embodiment.

If the center of the reference image 1 or the target image 11 coincides with the optical axis of the imaging lens 31, the greater the distance from the center, the more distortion intensity increases, as shown in FIG. 12. However, if the image sensor 34 is shifted as by image stabilization, the center of the reference image 1 or the target image 11 will no longer coincide with the optical axis of the imaging lens 31. Therefore, even if a distortion correction is applied in such a manner that, the greater the distance from the center of the reference image 1 or the target image 11, the greater the strength of the correction (this applies to all subject images obtained by image capture, not just to the reference image 1 and target image 11), there will be instances where an appropriate distortion correction cannot be performed. If the image sensor 34 has been shifted, this embodiment calculates a center position of a distortion correction in accordance with the amount of shift and the position to which the sensor has been shifted, and the distortion correction is applied using the calculated position as a reference.

FIG. 19 illustrates an example of distortion intensity map 80.

Regions 75, 76 and 77 have been defined such that, the greater the distance from the center, the more distortion intensity increases, as shown in FIG. 12.

If center C1 of the image sensor 34 and the optical axis of the imaging lens 31 coincide, as indicated by dashed line 111, the image of a subject obtained by image capture by the image sensor 34 sustains greater distortion intensity as position in the image moves outward from the center. However, if the image sensor 34 is shifted so that center C2 of the image sensor 34 is displaced from the optical axis of the imaging lens 31, as indicated by chain line 112, then the distortion intensity of the image of a subject obtained by image capture by the image sensor 34 does not increase with distance from the center C2 of the image of the subject (which is identical with the center C2 of the image sensor 34) but rather increases with distance from the optical axis C1 of the imaging lens 31. Distortion correction of the image of the subject must be carried out not by using the positional relationship with the center C2 of the image sensor 34 as the reference but by using the positional relationship with the optical axis of the imaging lens 31 as the reference.

FIG. 20 is a flowchart illustrating distortion correction processing.

If continuous shooting is carried out (step 121), as mentioned above, an image to be subjected to distortion correction processing is selected (step 122).

Next, the position to which the image sensor 34 is shifted at the time of shooting is calculated (step 123). The position to which the image sensor 34 is shifted can be calculated based upon the amount of movement and direction of movement of the image sensor 34 in the image-stabilization driving unit 41. Naturally, an arrangement may be adopted in which the image sensing apparatus is provided with a gyro sensor for detecting the position of the image sensor 34.

When the position to which the image sensor 34 has been shifted is calculated, reference is had to the calculated shift position and to the position of the optical axis of the imaging lens 31 to update the center position of the distortion correction with the position of the optical axis of the imaging lens 31 in the captured image serving as the center position of the distortion correction (step 124). The distortion correction of the selected image is carried out using the updated center position as the reference (step 125). In a case where the distortion correction is performed with regard to another image ("YES" at step 126), the processing from steps 122 to 125 is repeated.

In the distortion correction in the foregoing embodiment, the sensor position of the image sensor 34 is detected and the center position of the distortion correction is decided utilizing the detected sensor position. However, it may be arranged so that the shift position of the image sensor 34 is taken into consideration also in a case where the above-described distortion intensity map is created. In such case, according to the distortion intensity map shown in FIG. 12, the greater the distance from the center of the optical axis, the greater the distortion intensity will be.

FIGS. 21 to 25 illustrate another embodiment. In this embodiment, deformation is carried out in accordance with motion of the entire target image, the deformed target image and the reference image are compared and a region where there is a difference is found. The region where there is a difference is subjected to deformation processing using the distortion intensity of the reference image and the distortion intensity of the target image in the manner set forth above.

Figure 21:
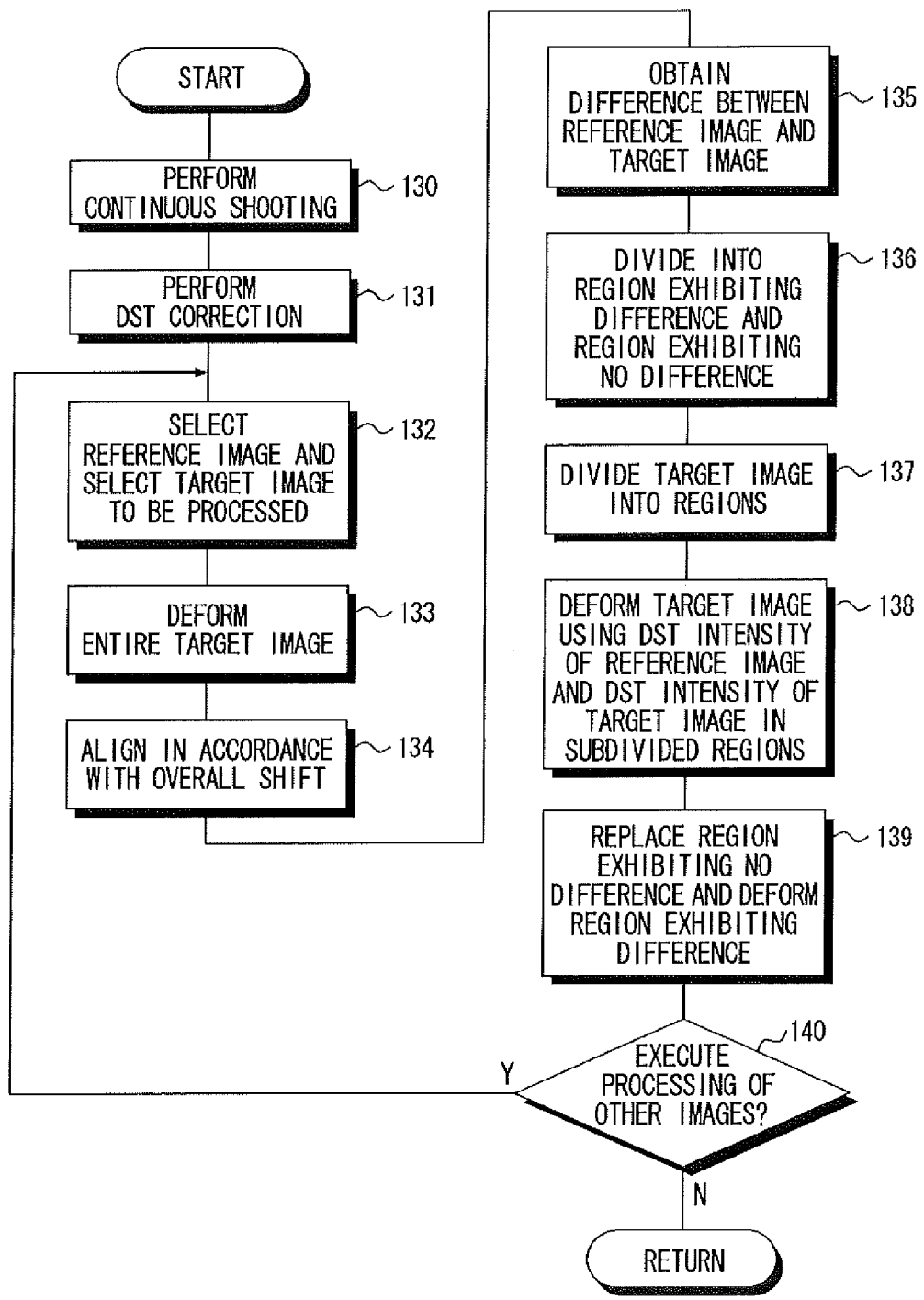

FIG. 21 is a flowchart illustrating processing executed by the image sensing apparatus.

As described above, continuous shooting is performed (step 130) and a distortion correction is applied to multiple image frames thus obtained (step 131). Next, a reference image and a target image that is to undergo the above-described deformation processing are selected (step 132). The selected target image is deformed upon estimating the motion of the entire target image (step 133), after which the reference image and the target image are aligned and combined (step 134).

Figure 22:
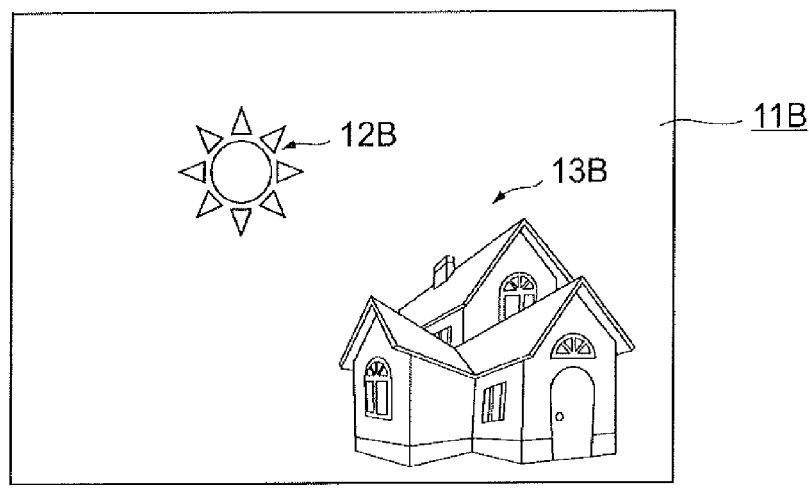
FIG. 22 is an example of a deformed target image.

FIG. 22 is an example of a target image 11B deformed upon estimating overall motion thereof.

The target image 11B includes sun 12B and house 13B.

Figure 23:
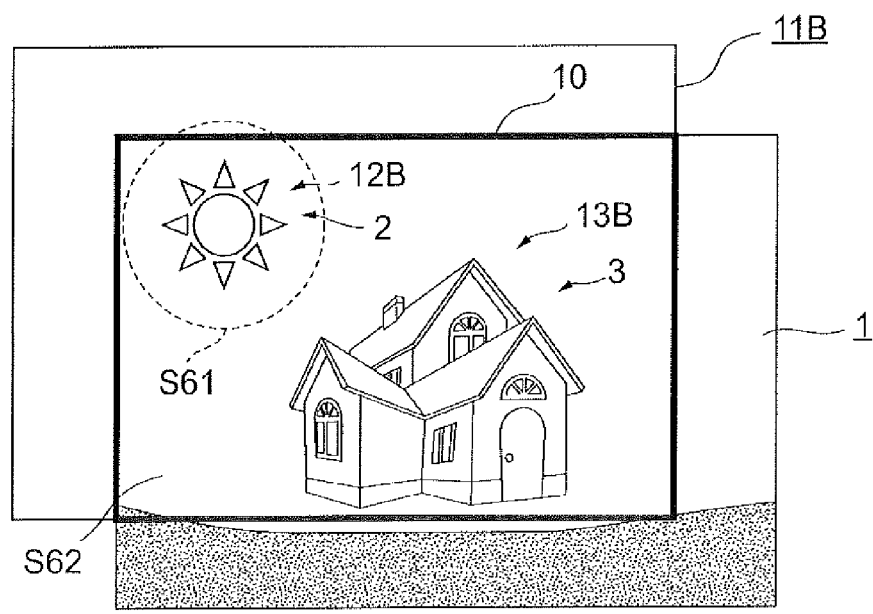
FIG. 23 illustrates the manner in which the reference image and the target image have been aligned.

FIG. 23 illustrates the reference image 1 and the target image 11B after they have been aligned.

Since the target image 11B has been deformed upon estimating its overall motion, the house 3 contained in the reference image 1 and the house 13B contained in the target image 11B coincide when the reference image 1 and target image 11B are aligned. However, an offset develops between the sun 2 contained in the reference image 1 and the sun 12B contained in the target image 11B because the distortion intensity of the sun 2 and that of the sun 12B differ.

With reference again to FIG. 21, the difference is obtained between the reference image 1 and the target image 11 (step 135) and the target image is divided into a region in which there is a difference (offset) and a region in which there is no difference (step 136).

With reference to FIG. 23, by obtaining the difference between the reference image 1 and the target image 11B, the region 10 common to the reference image 1 and to the target image 11B is divided into a region S61 in which there is a difference and a region S62 in which there is no difference. Thus it may be arranged so that the reference image 1 and target image 11B are aligned based upon a motion vector of the target image 11B with respect to the reference image 1. (This is carried cut by the aligning means.)

Figure 24:
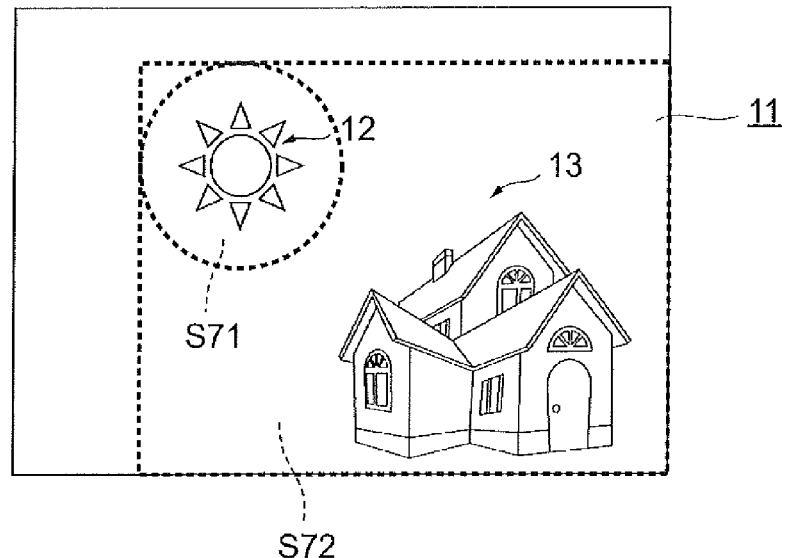
FIG. 24 is an example of the target image.

FIG. 24 is an example of the target image 11 prior to deformation taking overall offset into consideration.

When the region S61 in which there is a difference is detected by aligning the reference image 1 and the deformed target image 11B, as shown in FIG. 23, the region 10 common to the reference image 1 and to the target image 11 is divided into a region S71, which corresponds to this region S61 in which there is a difference, and a region S72, which corresponds to the region S62 in which there is no difference.

With reference again to FIG. 21, when the target image 11 prior to deformation is divided into the region S71 corresponding to the region S61 in which there is a difference and the region S72 corresponding to the region S62 in which there is no difference (step 137), the image within the region S71 corresponding to region S61 in which there is a difference is deformed so as to coincide with the reference image 1 by using the distortion intensity of the reference image 1 and the distortion intensity of the target image 11 (step 138).

Figure 25:
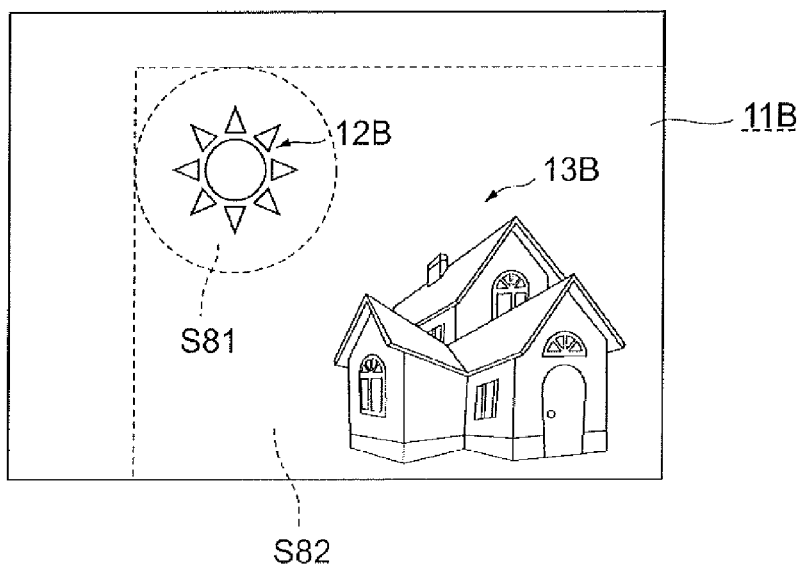
FIG. 25 is an example of a deformed target image.

FIG. 25 illustrates an example target image 11B after deformation thereof.

As shown in FIG. 23, a region S81 in which there is a difference between the target image 11B and the reference image 1 and a region S82 in which there is no difference are defined by aligning the images.

The region S72 corresponding to the region in which there is no difference in the target image 11 prior to deformation as shown in FIG. 24 is replaced by the region S82 corresponding to the region in which there is no difference in the target image 11B deformed as shown in FIG. 25. With regard to the region S71 shown in FIG. 24, it is deformed so as to coincide with the reference image 1 by using the distortion intensity of the reference image 1 and the distortion intensity of the target image 11 (step 139 in FIG. 21) in a manner similar to that described above.

In a case where similar processing is executed with regard to other images ("YES" at step 140), processing from step 132 onward is repeated.

FIGS. 26 to 30 illustrate a further embodiment. This embodiment detects whether a reference image or a target image contains a moving body.

Figure 26:
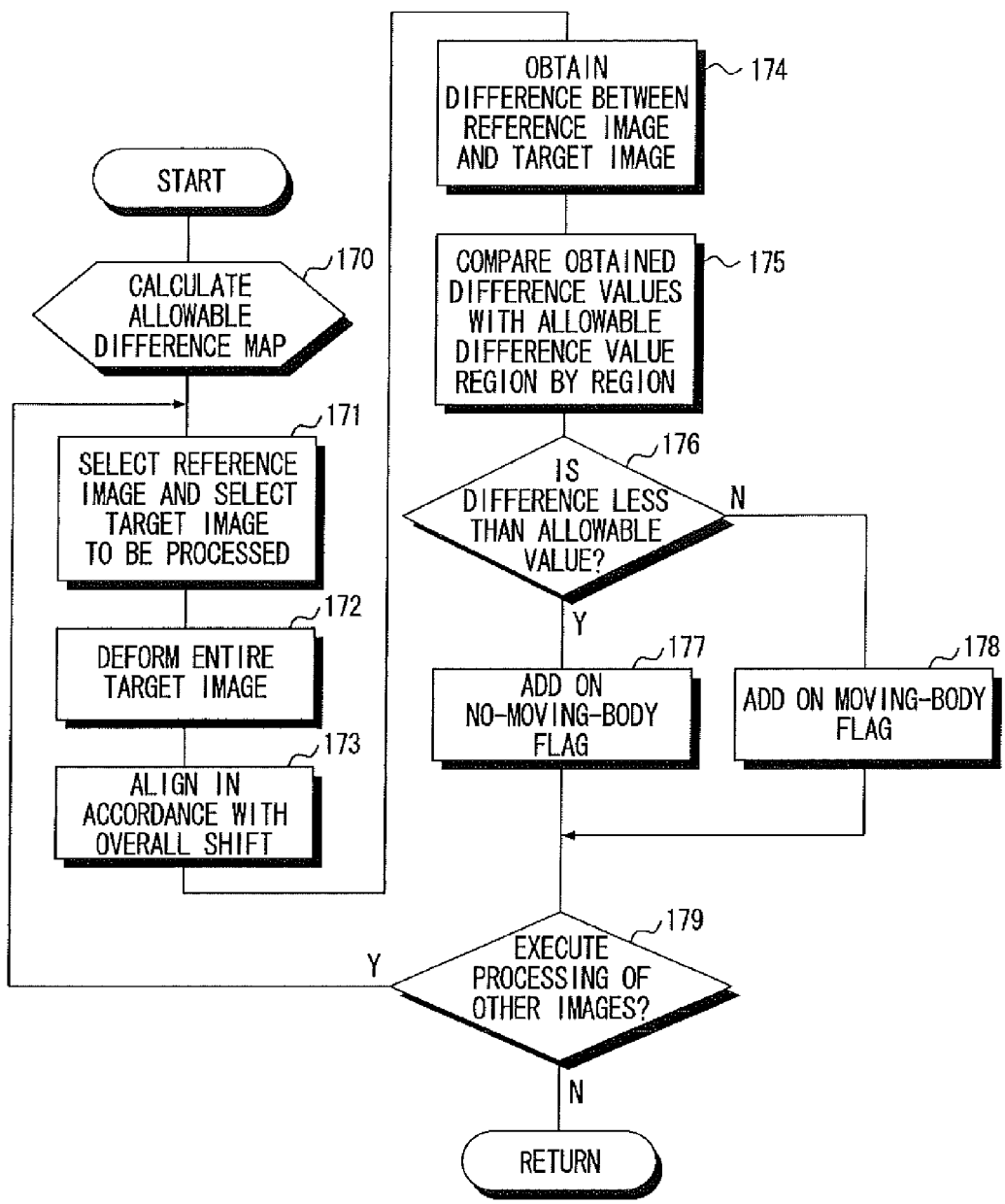
FIG. 26 is flowchart illustrating processing executed by the image sensing apparatus.

FIG. 26 is a flowchart illustrating processing executed by the image sensing apparatus.

First, an allowable difference map is generated (step 170).

Figure 27:
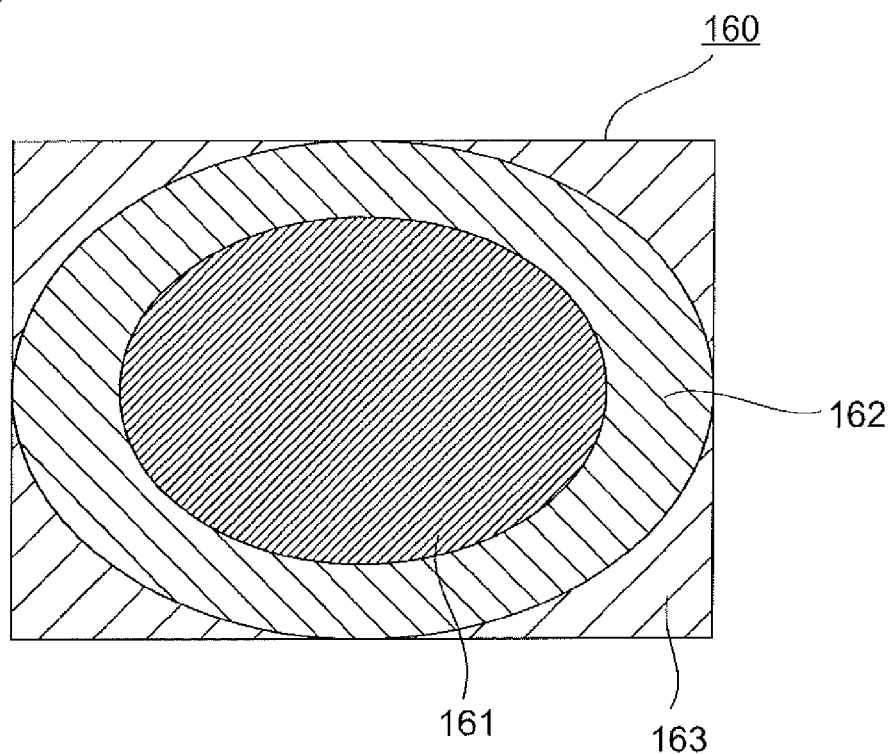
FIG. 27 is an example of an allowable difference map.

FIG. 27 is an example of an allowable difference map 160.

As described above, the difference is obtained between a reference image and a target image the entirety of which has been deformed taking overall misalignment into account. When this difference has been obtained, the allowable difference map 160 indicates how much difference is allowable.

A plurality of concentric, circular regions 161, 162 and 163 have been defined in the difference allowance map 160. The ring-shaped region 162 has been defined so as to surround the outside of the central region 161, and the region 163 has been defined around the region 162. The regions 161, 162 and 163 indicate allowable amounts of difference; the smaller the allowable amount of difference, the finer the hatching. The allowable amount of difference is the smallest for region 161, the next smallest for region 162 and the greatest for region 163. This is to take into consideration the fact that, since distortion intensity becomes progressively larger from the center to the outer side of an image, the difference also increases.

With reference again to FIG. 26, a reference image and a target image are selected (step 171).

Figure 28:
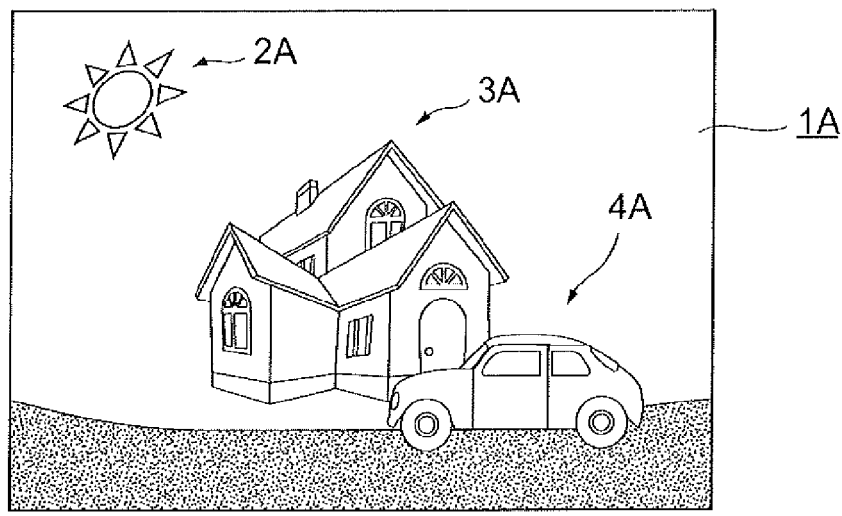
FIG. 28 is an example of a reference image.

FIG. 28 is an example of a reference image 1A.

The reference image 1A contains sun 2A, house 3A and automobile 4A.

Next, in a manner similar to that described above, the entire reference image is deformed (step 172 in FIG. 26). The target image is aligned with the reference image in conformity with the overall offset (step 173).

Figure 29:
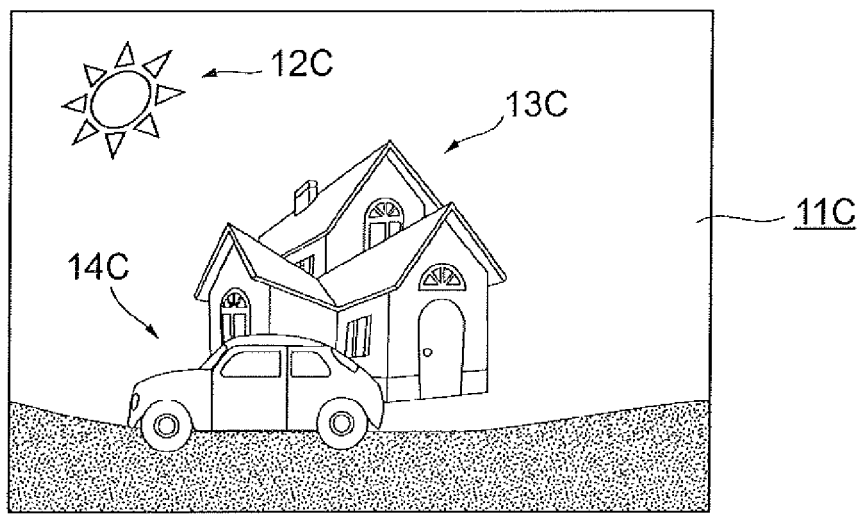
FIG. 29 is an example of a target image.

FIG. 29 is an example of a target image 11C.

The target image 11C shown in FIG. 29 contains sun 12C, house 13C and automobile 141C. The target image 11C has been deformed (shifted) in its entirety in such a manner that the sun 12C coincides with the sun 2A of the reference image LA shown in FIG. 28 and the house 13C coincides with the house 13A shown in FIG. 28. Thus, since corresponding subjects are at matching positions, the reference image 1A and the target image 11C can be aligned as set forth above.

The difference between the reference image 1A and the target image 11C is obtained by aligning the images (step 174).

Figure 30:
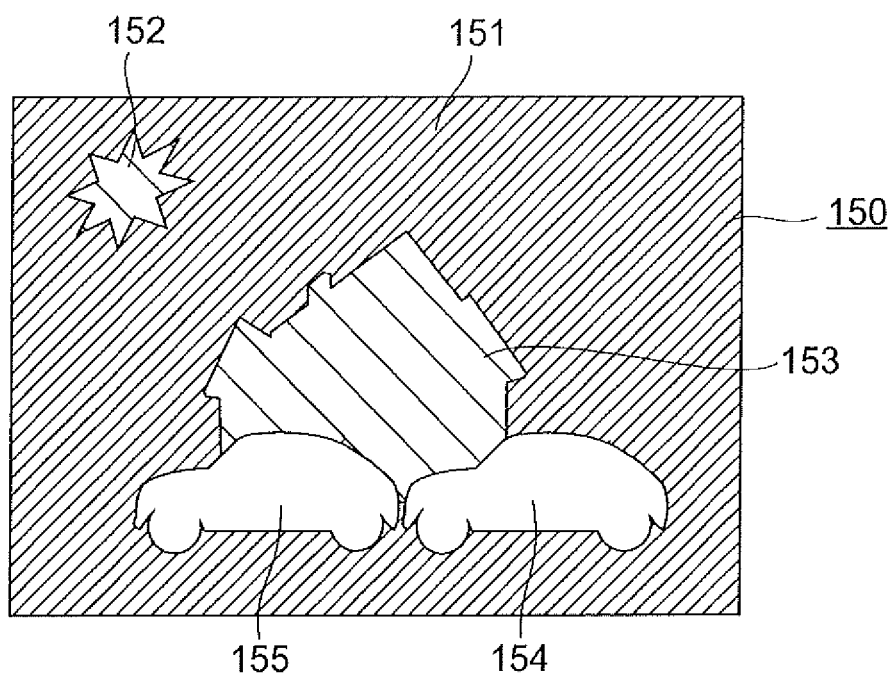
FIG. 30 is an example of a difference map.

FIG. 30 is an example of a difference map 150 indicating differential values.

The smaller the difference in the difference map 150, the finer the hatching.

The difference map 150 includes regions 151, 152, 153, 154 and 155. Region 151 indicates the difference between the background of the reference image 1A and the background of the target image 11C, region 152 indicates the difference between the sun 2A of the reference image 1A and the sun 12C of the target image 11C, region 153 indicates the difference between the house 3A of the reference image 1A and the house 13C of the target image 11C, region 154 indicates the difference between the automobile 4A of the reference image 1A and the background of the target image 11C, and region 155 indicates the difference between the background of the reference image 1A and the automobile 14C of the target image 11C. Since the automobile is moving between the moment of capture of the reference image 1A and the moment of capture of the target image 11C, there is a considerable difference between the position of the automobile 4A in the reference image 1A and the automobile 14C in the target image 11C. Consequently, the difference between the region 154 and the region 155 is large.

When the differences are obtained as shown in FIG. 30, a comparison is made with the allowable difference map 160, which is shown in FIG. 27, for every difference region 151, 152, 153, 154 and 155 (step 175).

If the result of the comparison between the differences and the allowable difference map 160 is that a difference is less than a tolerance value in any region ("YES" at step 176), then a flag to the effect that a moving body does not exist is added to the target image (step 177). If there is a location where the difference is equal to or greater than the tolerance value ("NO" at step 176), then a flag to the effect that a moving body exists is added to the target image (step 178). Thus the reference image 1 and the target image 11C are aligned based upon a motion vector of the target image 11C with respect to the reference image 1A and, if the extent of non-coincidence is equal to or greater than a predetermined amount, it is judged that the reference image 1 or the target image 11C contains a moving body.

In a case where processing regarding another target image is repeated, the processing from step 131 onward is executed (step 179).

A case where this embodiment has been applied to an image sensing apparatus is described above. However, the invention can also be applied, for example, to a built-in or externally mounted camera for a personal computer, or to a mobile terminal device, such as that described below, having a camera function.

A mobile telephone, a smart phone, a PDA (Personal Digital Assistant) and a mobile game device can be mentioned as examples of a mobile terminal device in this embodiment. The invention will now be described in detail with reference to the drawings taking a smart phone as an example.

Figure 31:
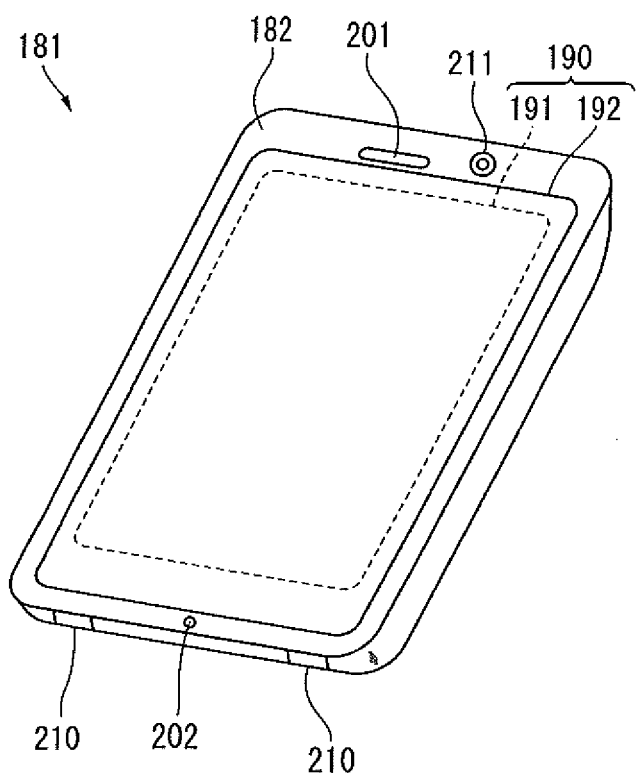
FIG. 31 is an external view of a smart phone.

FIG. 31 illustrates the external appearance of a smart phone 181 according to an embodiment of an image sensing apparatus in accordance with the present invention.

The smart phone 181 shown in FIG. 31 has a case 182 in the shape of a flat plate, and one side face of the case 182 is equipped with a display input unit 190 provided, in the form of a unitary body, with a display panel 191 serving as a display section and with an operating panel 192 serving as an input section. The case 182 is further equipped with a microphone 202, a speaker 201, an operating device 220 and a camera unit 221. The configuration of the case 182 is not limited to that shown here. For example, the case can have a configuration in which a display unit and an input unit are separate from each other, or a configuration having a clam-shell structure or a sliding mechanism.

Figure 32:
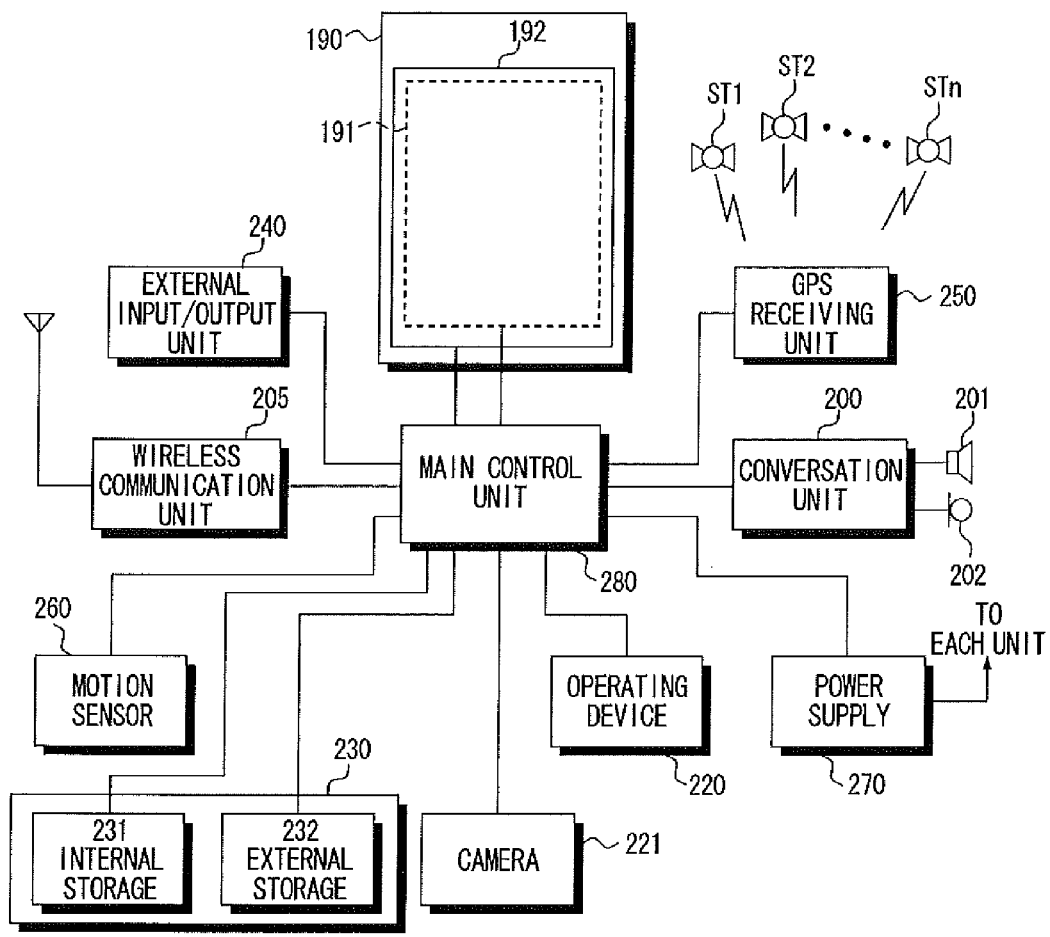
FIG. 32 is a block diagram illustrating the electrical configuration of the smart phone.
Figure 33:
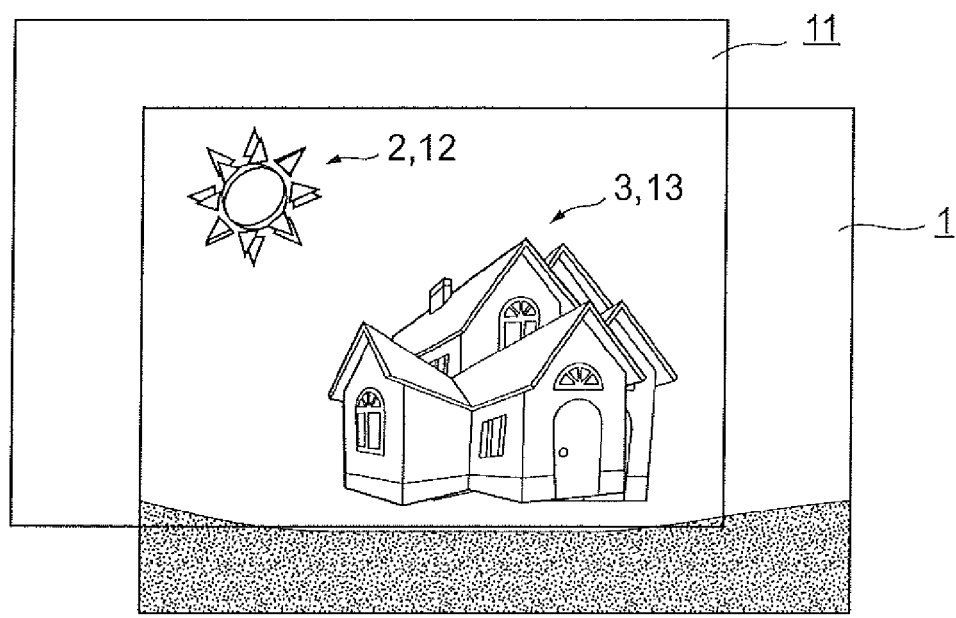
FIG. 33 is an image obtained by superimposing a reference image and a target image.

FIG. 32 is a block diagram illustrating the configuration of the smart phone 181 shown in FIG. 31.

As shown in FIG. 32, the main components of the smart phone are a wireless communication unit 205, the display input unit 190, a conversation unit 200, the operating device 220, the camera unit 221, a storage unit 230, an external input/output unit 240, a GPS (Global Positioning System) receiving unit 250, a motion sensor 260, a power supply unit 270 and a main control unit 280. Further, the smart phone 181 is equipped with a wireless communication function, which is the main function of the smart phone 181, for performing mobile wireless communication via a base station unit BS and a mobile communication network NW.

In accordance with a command from the main control unit 280, the wireless communication unit 205 performs wireless communication with the base station BS accommodated in the mobile communication network NW. Using such wireless communication, the wireless communication unit 205 sends and receives various file data such as voice data and image data as well as email data, and receives data such as World-Wide Web data and streaming data.

The display input unit 190 is equipped with the display panel 191 and operating panel 142 in the form of a so-called "touch panel" which, under the control of the main control unit 280, displays images (still images and moving images) and text information and the like to thereby convey information to the user visually, and detects operations made by the user in response to the information displayed.

The display panel 191 employs a display cell such as an LCD (Liquid Crystal Display) or an OELD (Organic Electro-Luminescence Display) as a display device. The operating panel 192 is a device on which an image, which is displayed on the display screen of the display panel 191, is viewably placed, and detects one or multiple coordinates. It is operated by the user's finger or by a stylus. When this device is touched by the user's finger or by a stylus, the device outputs a detection signal, which is generated due to such operation, to the main control unit 280. Next, based upon the detection signal received, the main control unit 280 detects the position (coordinates) touched on the display panel 191.

As illustrated in FIG. 31, the display panel 191 and the operating panel 192 of the smart phone 181 exemplified as an embodiment of an image sensing apparatus are integrated into a whole to thereby construct the display input unit 190. The operating panel 192 is placed so as to completely cover the display panel 191. In a case where such as arrangement is adopted, the operating panel 192 may be equipped with a function for detecting user operation even with regard to an area exterior to the display panel 191. In other words, the operating panel 192 may just as well be equipped with a detection area (referred to as a "display area" below) with regard to the portion that overlaps the display panel 191, and with a detection area (referred to as a "non-display area" below) with regard to the fringe portion that does not overlap the display panel 191.

It should be noted that although the size of the display area and the size of the display panel 191 may coincide perfectly, the two need not necessarily coincide. Further, the operating panel 192 may be equipped with two sensitive regions, namely one on the fringe portion and one on the portion inwardly thereof. Furthermore, the width of the fringe portion is designed appropriately in accordance with the size of the case 182. In addition, systems such as a matrix switch system, resistive-film system, surface elastic wave system, infrared system, electromagnetic induction system and electrostatic capacitance system can be mentioned as position detection systems employed by the operating panel 192, and any of these systems can be adopted.

The conversation unit 200, which has the speaker 201 and the microphone 202, converts the user's voice, which has entered through the microphone 202, to voice data processable by the main control unit 280, decodes voice data, which has been received by the wireless communication unit 205 or external input/output unit 240, and outputs the decoded data from the speaker 201. Further, as shown in FIG. 31, and by way of example, the speaker 201 can be mounted on the same face as the face provided with the display input unit 190, and the microphone 202 be mounted on the side face of the case 182.

The operating device 220, which is a hardware key using a key switch or the like, accepts commands from the user. For example, as shown in FIG. 31, the operating device 220 is a push-button switch mounted on the side face of the case 182 of the smart phone 181. The switch is turned ON by being pressed by a finger or the like and is restored to the OFF state by the restoration force of a spring or the like when the finger is removed.

The storage unit 230 stores the control program and control data of the main control unit 280, application software, address data associated with the names and telephone numbers, etc., of communicating parties, email data sent and received, Web data downloaded by Web browsing, and downloaded content, and also stores streaming data temporarily. Further, the storage unit 230 is constituted by an internal storage device 231, which is built in the smart phone, and a removable external storage device 232 having an external memory slot. The internal storage device 231 and external storage device 232 constructing the storage unit 230 are implemented using storage media such as a flash memory, hard disk, a multimedia card micro-type memory or card-type memory [e.g., Micro SD (registered trademark) memory or the like], RAM (Random-Access Memory) and ROM (Read-Only Memory).

The external input/output unit 240, which functions as the interface with all external devices connected to the smart phone 181, is for connecting directly or indirectly other external devices as by communication [such as Universal Serial Bus (USB) or IEEE 1394] or network [e.g., Internet, wireless LAN (Local-Area Network), Bluetooth (registered trademark), RFID (Radio-Frequency Identification), Infrared Data Association: IrDA (registered trademark), UWB (Ultra-Wideband (registered trademark) or Zigbee (registered trademark)].

Examples of devices connected to the smart phone 181 are a wired/wireless headset; wired/wireless external charging device; wired/wireless data port; memory card or SIM (Subscriber Identity Module Card)/UIM (User Identity Module) card connected via a card socket; external audio/video device connected via an audio/video I/O (Input/Output) terminal; wirelessly connected external audio/video device; wired/wireless connected smart phone; wired/wirelessly connected personal computer; wired/wirelessly connected PDA; wired/wirelessly connected personal computer; and earphone. The external input/output section can be adapted so as to transmit data, which has been received from such external devices, to each component within the smart phone 181, and so as to transmit data within the smart phone 181 to the external devices.

In accordance with a command from the main control unit 280, the GPS receiving unit 250 receives GPS signals sent from GPS satellites ST1 to STn, executes positioning processing that is based upon multiple GPS signals received, and detects position comprising the longitude, latitude and elevation of the smart phone 181. When position information is capable of being acquired from the wireless communication unit 205 or the external input/output unit 240 (e.g., wireless LAN), the GPS receiving unit 250 can also detect position using this position information.

The motion sensor 260, which has a three-axis acceleration sensor, for example, detects physical motion of the smart phone 181 in accordance with a command from the main control unit 280. The traveling direction and acceleration of the smart phone 181 are detected by detecting the physical motion of the smart phone 181. The result of such detection is output to the main control unit 280.

In accordance with a command from the main control unit 280, the power supply unit 270 supplies each unit of the smart phone 181 with power stored in a battery (not shown).

The main control unit 280, which is equipped with a microprocessor, operates in accordance with a control program and control data stored by the storage unit 230 and controls overall operation of each unit of the smart phone 181. Further, the main control unit 280 has a mobile communication control function, which controls each unit of the communication system, and an application processing function, in order to perform voice communication and data communication through the wireless communication unit 205.

The application processing function is implemented by operation of the main control unit 280 in accordance with application software stored by the storage unit 230. Examples of the application processing function are an infrared communication function for communicating data with an opposing device by controlling the external input/output unit 240, an email function for sending and receiving email, and a Web browsing function for viewing Web pages.

The main control unit 280 has an image processing function for displaying video on the display input unit 190 based upon received data and image data (still-image data and moving-image data) such as downloaded streaming data. The image processing function refers to a function whereby the main control unit 280 decodes the above-mentioned image data, applies image processing to the decoded result and displays the resultant image on the display input unit 190.

The main control unit 280 further executes display control of the display panel 191 and operation detection control for detecting user operation through the operating device 220 and operating panel 192.

By executing display control, the main control unit 280 displays icons for launching application software, software keys such as a scroll bar, or displays a window for creating email. It should be noted that the scroll bar refers to a software key for accepting a command, which moves a displayed portion of an image, with regard to an image too large to fit in the display area of the display panel 191.

Further, by executing operation detection control, the main control unit 280 detects user operation performed via the operating device 220, or accepts tapping of the icons and character-string inputs to an input section of the above-mentioned window through the operation panel 182, or accepts a displayed-image scroll request issued through the scroll bar.

Furthermore, the main control unit 280 has a touch-panel control function which, through execution of the operation detection function, determines whether a position touched on the operating panel 192 is a portion (the display area) that overlaps the display panel 191 or a fringe portion (the non-display area) that does not overlap the display panel 191, and controls the sensitive region of the operating panel 192 and the display positions of software keys.

Further, the main control unit 280 detects gestures applied to the operating panel 192 and is capable of executing preset functions in accordance with a detected gesture. Here a gesture refers not to a simple, conventional touching operation but to the tracing of a path by a finger or the like, the designation of multiple positions simultaneously, or an operation which, by combining these, traces a path with regard to at least one of multiple positions.

The camera unit 221 is a digital camera for performing electronic shooting using a CMOS (Complementary Metal-Oxide Semiconductor) or CCD (Charge-Coupled Device) or the like. Further, under control exercised by the main control unit 280, the camera unit 221 converts image data obtained by imaging to compressed image data such as JPEG (Joint Photographic coding Experts Group) data and is capable of storing the compressed image data in the storage unit 230 or of outputting the data through the external input/output unit 240 or wireless communication unit 205. In the smart phone 181 shown in FIG. 31, the camera unit 221 has been mounted on the same side as that having the display input unit 190. However, the mounting position of the camera unit 221 is not limited to that shown. The camera unit 221 may be mounted on the back side of the display input unit 190, and it is permissible to mount a plurality of camera units 221. It should be noted that in a case where a plurality of the camera units 221 have been mounted, the camera units 221 used in shooting may be switched among and used singly, or shooting may be performed by using the plurality of camera units 221 simultaneously.

Further, the camera unit 221 can be utilized for various functions possessed by the smart phone 181. For example, an image acquired by the camera unit 221 can be displayed on the display panel 191, and the image from the camera unit 221 can be utilized as one operational input on the operating panel 192. Further, when the GPS receiving unit 250 detects position, position can also be detected by referring to the image from the camera unit 221. Furthermore, by referring to the image from the camera unit 221, the optical-axis direction of the camera unit 221 of the smart phone 181 can be determined without using a three-axis acceleration sensor or in conjunction with a three-axis acceleration sensor, and the present environment of use can be determined. Naturally, the image from the camera unit 221 can be utilized within the application software as well.

In addition, such information as position information acquired by the GPS receiving unit 250, voice information acquired by the microphone 202 (which may be text information obtained by a voice-to-text conversion performed by the main control unit or the like), and attitude information acquired by the motion sensor 260 can be appended to still-image or moving-image data and the result can be stored in the storage unit 230 or can be output through the external input/output unit 240 or wireless communication unit 205.

In a case where the processing according to this embodiment is applied to the smart phone 181, the above-described processing would be executed by the main control unit 280.

As many apparently widely different embodiments of the present invention can be made without departing from the spirit and scope thereof, it is to be understood that the invention is not limited to the specific embodiments thereof except as defined in the appended claims.

What is claimed is:

1. An image deformation apparatus comprising:
   an image input device for inputting multiple frames of an image obtained by imaging the same subject multiple times;

a reference image decision device for deciding a reference image from among the multiple frames of the image that have been input from said image input device;

a target image decision device for deciding a target image from among the multiple frames of the image other than the reference image that have been input from said image input device;

a region dividing device for dividing the reference image decided by said reference image decision device and the target image decided by said target image decision device into regions that conform to amounts of optical distortion;

a region subdividing device for subdividing a common region, which is in the target image and is a region common to the reference image and to the target image, into regions in each of which both amount of optical distortion of the reference image and amount of optical distortion of the target image can be partitioned, in accordance with the amounts of optical distortion in respective ones of the regions of the reference image and regions of the target image divided by said region dividing device; and a deformation device for deforming the target image using the amounts of optical distortion of the reference image and amounts of optical distortion of the target image obtained from the regions subdivided by said region subdividing device, and making a subject in the common region coincide with the reference image.

2. The apparatus according to claim 1, further comprising a correction device for performing an optical-distortion correction in a case where the optical axis of an imaging optical system utilized in capturing the reference image and the target image is offset from centers of the reference image and target image, the optical-distortion correction being performed centered on offset position of the optical axis;

wherein said region dividing device divides the reference image and the target image, the amounts of optical distortion of which have been corrected by the correction device, into regions in accordance with the corrected amounts of optical distortion.

3. The apparatus according to claim 1, further comprising an aligning device for aligning the reference image and the target image based upon a motion vector of the target image with respect to the reference image;

wherein if the reference image and target image have been aligned by said aligning device, said region dividing device divides, with regard to non-coincident portions of the images, the reference image and the target image into regions in accordance with the corrected amounts of optical distortion.

4. The apparatus according to claim 1, further comprising:

an aligning device for aligning the reference image and the target image based upon a motion vector of the target image with respect to the reference image; and a determination device for determining that the reference image or the target image contains a moving body if degree of non-coincidence is equal to or greater than a predetermined value.

5. The apparatus according to claim 1, wherein said region dividing device divides the reference image and the target image into rectangular regions or concentric circular regions that conform to amounts of optical distortion.

6. The apparatus according to claim 1, further comprising a compositing device for combining the reference image and the target image that have been deformed by said deformation device.

7. A method of controlling operation of an image deformation apparatus, said method comprising steps of:

an image input device inputting multiple frames of an image obtained by imaging the same subject multiple times;

a reference image decision device deciding a reference image from among the multiple frames of the image that have been input from the image input device;

a target image decision device deciding a target image from among the multiple frames of the image other than the reference image that have been input from the image input device;

a region dividing device dividing the reference image decided by the reference image decision device and the target image decided by the target image decision device into regions that conform to amounts of optical distortion;

a region subdividing device subdividing a common region, which is in the target image and is a region common to the reference image and to the target image, into regions in each of which both amount of optical distortion of the reference image and amount of optical distortion of the target image can be partitioned, in accordance with the amounts of optical distortion in respective ones of the regions of the reference image and regions of the target image divided by the region dividing device; and a deformation device deforming the target image using the amounts of optical distortion of the reference image and amounts of optical distortion of the target image obtained from the regions subdivided by the region subdividing device, and making a subject in the common region coincide with the reference image.

* * * * *